(12) United States Patent
Huang

(10) Patent No.: US 12,446,553 B2
(45) Date of Patent: Oct. 21, 2025

(54) TOWER FURNITURE FOR PET ANIMAL

(71) Applicant: Fujian Fuhele Supply Chain Co., Ltd., Fuzhou (CN)

(72) Inventor: Jin Huang, Changle (CN)

(73) Assignee: Fujian Fuhele Supply Chain Co., Ltd., Fuzhou (CN)

( * ) Notice: Subject to any disclaimer, the term of this patent is extended or adjusted under 35 U.S.C. 154(b) by 0 days.

(21) Appl. No.: 18/595,837

(22) Filed: Mar. 5, 2024

(65) Prior Publication Data
US 2025/0280796 A1    Sep. 11, 2025

(51) Int. Cl.
A01K 15/02    (2006.01)

(52) U.S. Cl.
CPC ................ A01K 15/027 (2013.01)

(58) Field of Classification Search
CPC .................... A01K 15/027; F16B 23/0061
USPC .................................. 248/161, 405
See application file for complete search history.

(56) References Cited

U.S. PATENT DOCUMENTS

| | | | | |
|---|---|---|---|---|
| 5,374,785 A * | 12/1994 | Bedkowski | ......... | H02G 3/0675 |
| | | | | 174/651 |
| 7,775,496 B2 * | 8/2010 | Johnson | .............. | E04C 3/32 |
| | | | | 248/405 |
| 11,882,937 B2 * | 1/2024 | Hoyt | .............. | A47B 96/14 |
| 2005/0205729 A1 * | 9/2005 | Wang | ............... | F16M 13/027 |
| | | | | 248/161 |
| 2008/0149042 A1 * | 6/2008 | Halpern | ........... | A01K 15/027 |
| | | | | 119/706 |
| 2016/0329002 A1 * | 11/2016 | Waid | .............. | F16M 13/027 |
| 2022/0304468 A1 * | 9/2022 | Hoyt | .............. | F16M 13/02 |

FOREIGN PATENT DOCUMENTS

| | | |
|---|---|---|
| CN | 110388363 A | 10/2019 |
| CN | 111295114 A | 6/2020 |
| CN | 112203560 A | 1/2021 |

* cited by examiner

*Primary Examiner* — Christopher D Hutchens
(74) *Attorney, Agent, or Firm* — Nitin Kaushik

(57) ABSTRACT

Provided is a tower furniture for pet animal that is easy for installation. The tower furniture includes: a height-adjustable top plate 50 on an upper end portion of the support member 25 at an uppermost part; a thread through fitting 61 provided at an upper end of the support member 25 at the uppermost part; an adjustment fitting 62 provided at a lower surface of the top plate 50; an elongated thread 63 configured to be screwed into the adjustment fitting 62 and a lower end portion configured to be inserted into the thread through fitting 61; a first nut 64 configured to be screwed onto the elongated thread 63 and to press against an adjustment fitting 62 side; and a second nut 66 configured to be screwed onto the elongated thread 63 and to press against an upper end side of the support member 25.

6 Claims, 32 Drawing Sheets

TOWER FURNITURE FOR PET ANIMAL

TECHNICAL FIELD

The present invention relates to tower furniture for a pet animal, and particularly relates to a ceiling strut structure such as a cat tower.

BACKGROUND

In the related art, a cat tower that allows a domestic cat, who tends to lack exercise, to climb and play indoors. The cat tower includes a support formed by vertically connecting a plurality of support members with a table or the like sandwiched, and a base and a top plate provided at a lower end and an upper end of the support, and can be installed vertically between a floor and a ceiling. The top plate is provided in a height-adjustable manner with respect to the support member at an uppermost part. In a case of installing the cat tower, after assembling the cat tower, the cat tower is erected vertically on the floor with the height of the top plate slightly lowered, then the height of the top plate is adjusted, and the top plate is pressed against the ceiling and locked.

A height adjustment structure (ceiling lock structure) for a top plate 1 of the cat tower in the related art will be described with reference to FIGS. 1 to 3. FIG. 1 is a partially omitted cross-sectional view showing an upper portion of the cat tower installed between the floor and a ceiling 15, FIG. 2 is a cross-sectional view of the support member at the uppermost part in FIG. 1, and FIG. 3 is an exploded view of a top plate height adjustment unit. In FIGS. 1 to 3, a cylindrical lid member 3 made of plastic is fitted to an upper end portion of a support member 2 at an upper part, and a nut 4 as a female thread fitting is embedded in a lower surface side of a through hole 3a at a center of the lid member 3. A disk-shaped upper end plate 5 made of wood is placed on the support member 2. An unthreaded hole 5a is formed in a center of the upper end plate 5, and the unthreaded hole 5a, the hole 3a of the lid member 3, and the nut 4 are coaxially arranged.

The top plate 1 is made of wood, and an adjustment fitting 7 as a female thread fitting is attached to a center of a lower surface of the top plate 1 in a manner of protruding downward. The adjustment fitting 7 is a bottomed fitting with a female thread. An upper end portion of an elongated thread 8 is screwed into the adjustment fitting 7. Two first nuts 10 are screwed onto an upper portion of the elongated thread 8 with a washer 9 sandwiched so as to press against the adjustment fitting 7. A lower end portion of the elongated thread 8 is screwed into the nut 4 through the unthreaded hole 5a of the upper end plate 5 and the hole 3a of the lid member 3. Two second nuts 12 are screwed onto a lower portion of the elongated thread 8 with a washer 11 sandwiched so as to press against the upper end plate 5 downward. A reaction force received from the upper end plate 5 is transmitted to the top plate 1 via the elongated thread 8, and the top plate 1 is pressed against the ceiling 15 and locked.

When a method for adjusting a height of a top plate in the related art is described with reference to FIGS. 4 to 11 and FIG. 1, first, the two first nuts 10 are screwed onto the upper portion of the elongated thread 8 with the washer 9 sandwiched, the two second nuts 12 are screwed onto the lower portion with the washer 11 sandwiched, and a lower side of the elongated thread 8 is inserted into the unthreaded hole 5a of the upper end plate 5 ((1) in FIG. 4). Then, the upper end portion of the elongated thread 8 is screwed into the adjustment fitting 7 of the top plate 1, the two first nuts 10 are turned with a wrench and are pressed strongly against the adjustment fitting 7, and the top plate 1 and the top plate height adjustment unit are integrated ((2) and (3) in FIG. 4).

Next, the lower end portion of the elongated thread 8 attached to the top plate 1 is inserted into the hole 3a of the lid member 3 of the support member 2 at the uppermost part of the cat tower (in this case, the upper end plate 5 goes down the elongated thread 8 and comes into contact with an upper end surface of the support member 2), and while rotating the top plate 1 and the elongated thread 8 together about an axis, the lower portion of the elongated thread 8 is screwed into the nut 4 (FIGS. 5 and 6). Accordingly, the top plate 1 is in a state of being supported by the support member 2. The top plate 1 is rotated many times in a downward direction, and the nuts 12 come close to the upper end plate 5 (FIG. 7).

Once the cat tower is erected vertically on the floor, if a distance between the top plate 1 and the upper end of the support member 2 at the uppermost part is too large and the top plate 1 tends to abut the ceiling 15, the two second nuts 12 are turned to move to the upper portion of the elongated thread 8 (FIG. 8), the top plate 1 is turned in the same direction as before to descend (FIG. 9). On the other hand, if the distance between the top plate 1 and the upper end of the support member 2 is too small, the top plate 1 is turned in an opposite direction to rise.

In this way, once the top plate 1 is at an appropriate height where the top plate 1 does not abut the ceiling 15, the cat tower is erected vertically on the floor, and the top plate 1 is turned in the opposite direction many times to raise the height of the top plate 1 by an operator standing on a stepladder (FIG. 10). Then, when the top plate 1 comes into contact with the ceiling 15 (FIG. 11), the second nuts 12 are turned with a wrench and tightened to the upper end plate 5, and the first nuts 10 are also tightened to the adjustment fitting 7. The reaction force received from the upper end plate 5 is transmitted to the top plate 1 via the elongated thread 8, and the top plate 1 is pressed against the ceiling 15 and locked (FIG. 1).

However, in the structure of the above-described top plate height adjustment unit in the related art, when the top plate 1 is supported by the support member 2 in advance, or when the height of the top plate 1 is adjusted by standing on a stepladder after the cat tower is erected on the floor, the top plate 1 with an elongated thread and the second nuts 12 have to be rotated many times, which is a troublesome and time-consuming operation.

SUMMARY

The present invention has been made in view of the above-described problems in the related art, and an object of the present invention is to provide tower furniture for a pet animal that does not require much effort for installation.

An invention according to claim 1 relates to indoor tower furniture for a pet animal, the tower furniture including:
  a support formed by vertically coupling a plurality of support members;
  a height-adjustable top plate supported by the support member at an uppermost part;
  an unthreaded hole portion provided at an upper end portion of the support member at the uppermost part;
  a female thread fitting provided at a lower surface of the top plate;

an elongated thread having an upper end portion configured to be screwed into the female thread fitting and a lower end portion configured to be inserted into the unthreaded hole portion;

a first nut configured to be screwed onto an upper portion of the elongated thread and to press against a female thread fitting side or a lower surface side of the top plate; and a second nut configured to be screwed onto a lower portion of the elongated thread and to press against an upper end side of the support member at the uppermost part.

In an invention according to claim 2, an upper end plate is placed on an upper side of the support member at the uppermost part, the unthreaded hole portion configured to allow the lower portion of the elongated thread to be inserted is provided in the upper end plate, and the second nut screwed onto the elongated thread on an upper side of the upper end plate is configured to press against the upper end side of the support member at the uppermost part via the upper end plate.

In an invention according to claim 3, one or more grooves are provided in a side circumferential surface of the second nut to allow rotation about an axis by inserting a flathead screwdriver.

In an invention according to claim 4, a base is attached to a lower side of the support member at a lowest part, and an earthquake-proof gel member is provided on each of a lower surface of the base and an upper surface of the top plate.

According to the present invention, when installing the tower furniture for a pet animal between a floor and a ceiling, for example, the upper end portion of the elongated thread whose upper portion is screwed by the first nut and whose lower portion is screwed by the second nut is screwed in advance into the female thread fitting on the lower surface of the top plate to integrate the top plate and the elongated thread, and the lower portion of the elongated thread with the top plate attached is straight inserted, without turning, into the unthreaded hole portion provided in the upper end of the support member at the uppermost part in advance. After the tower furniture is erected vertically, an operator stands on a stepladder to pull up the top plate from the support member at the uppermost part straight along with the elongated thread without rotating the top plate about an axis. When the top plate comes into contact with the ceiling, the top plate can be easily locked to the ceiling by turning the second nut to press against the upper end side of the support member at the uppermost part, and thus it is unnecessary to turn the top plate and the elongated thread many times to adjust a height of the top plate, and an installation operation can be easily performed in a short time.

Figure 26:
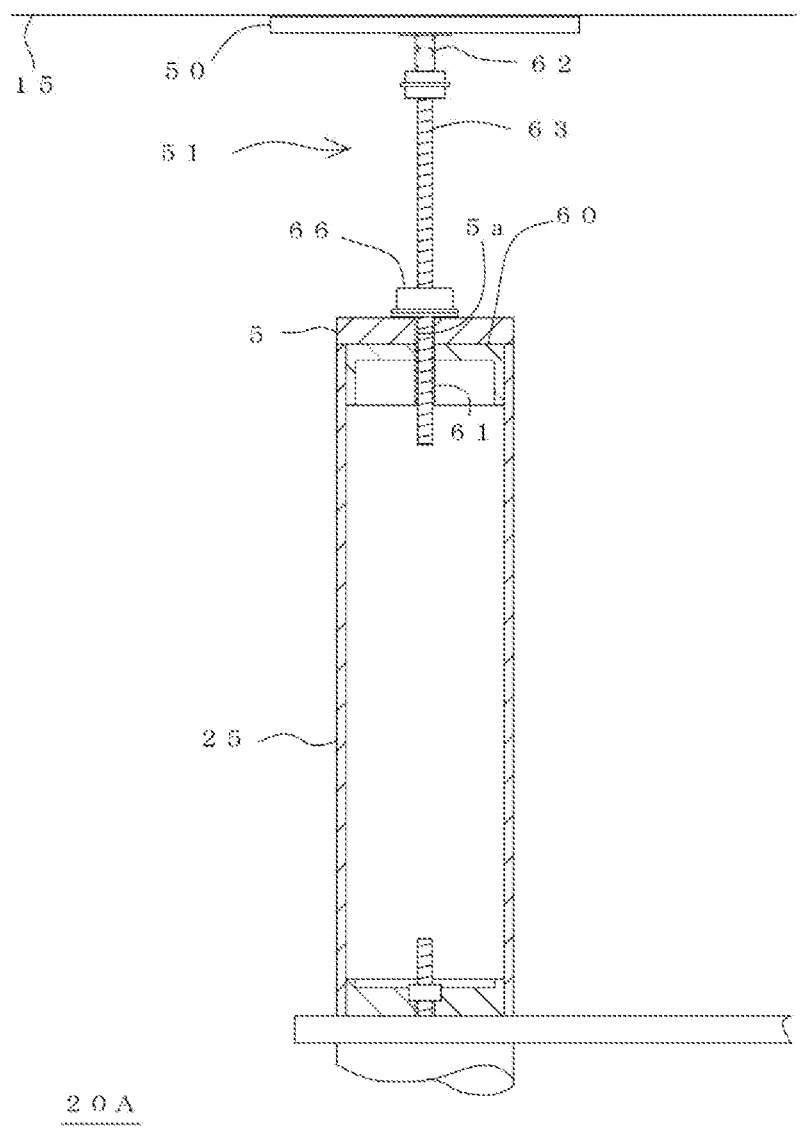
FIG. 26 is a cross-sectional view of an upper portion of a cat tower according to a modification of FIG. 12.
Figure 27:
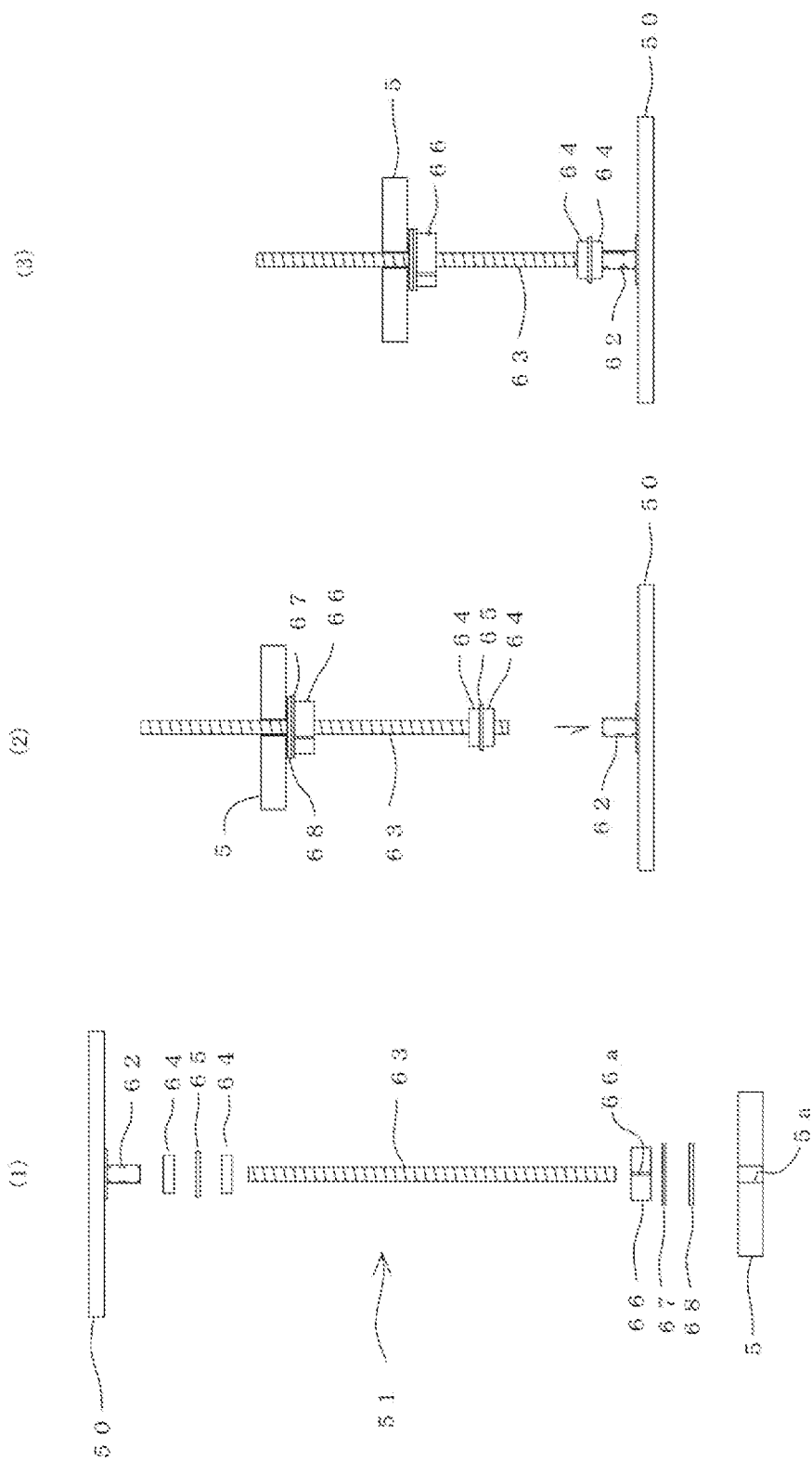
Figure 28:
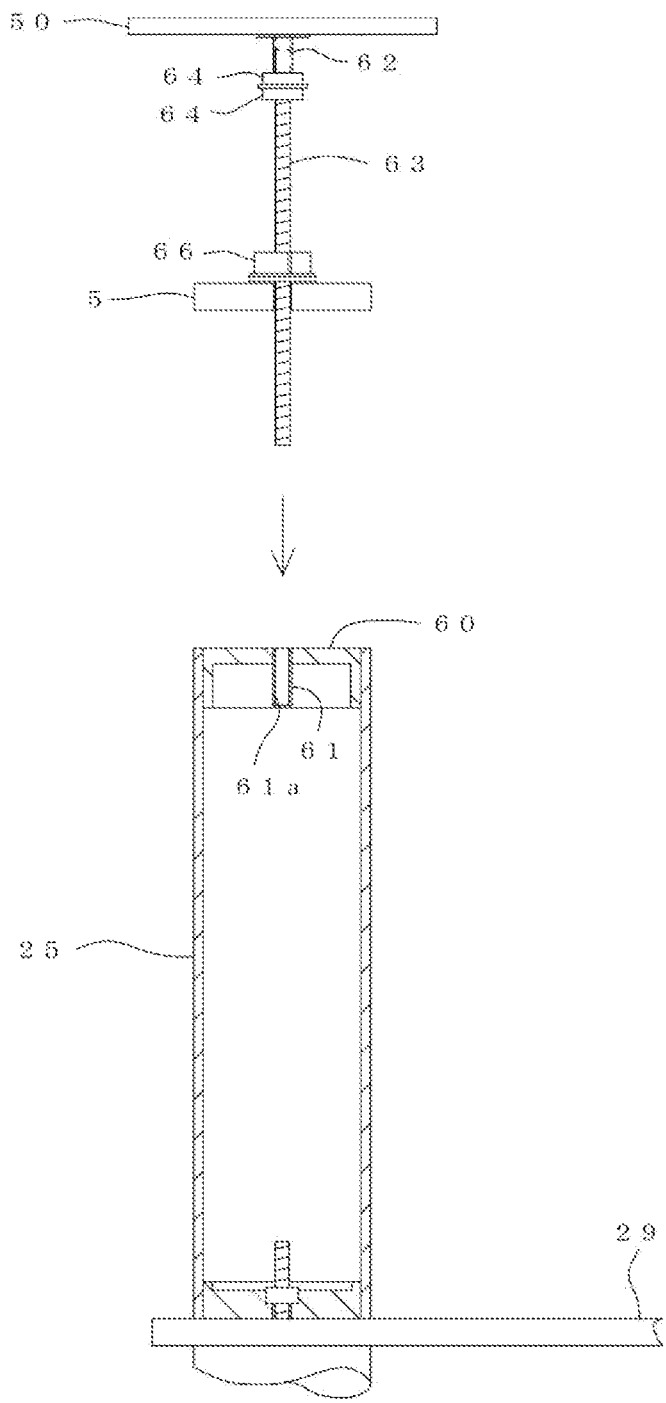
Figure 29:
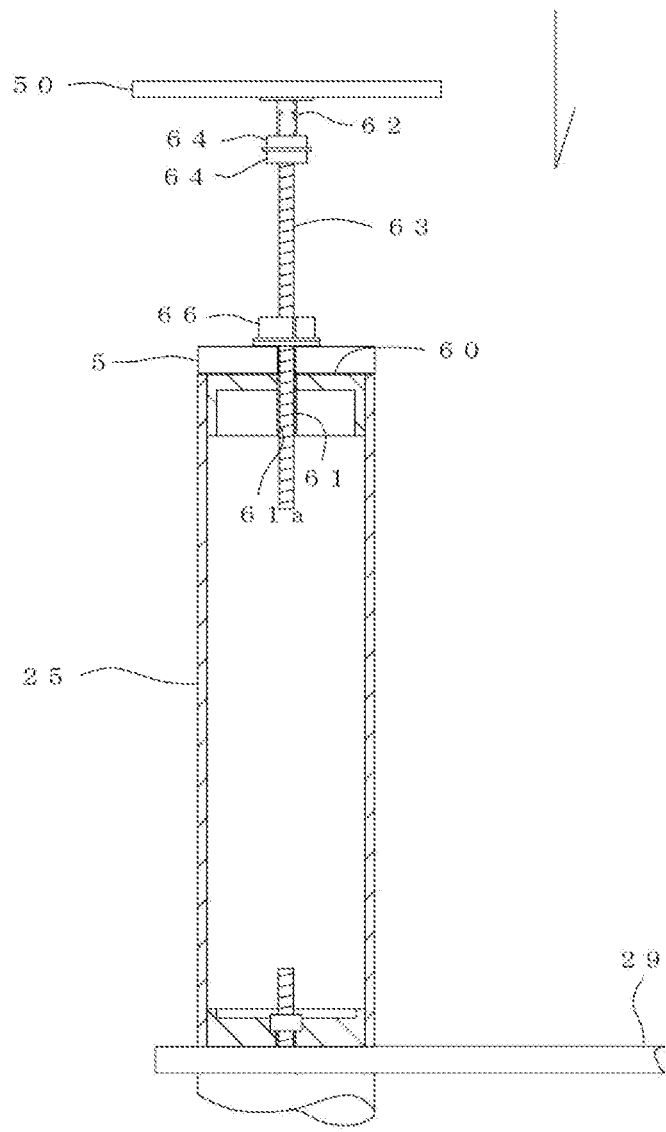
Figure 30:
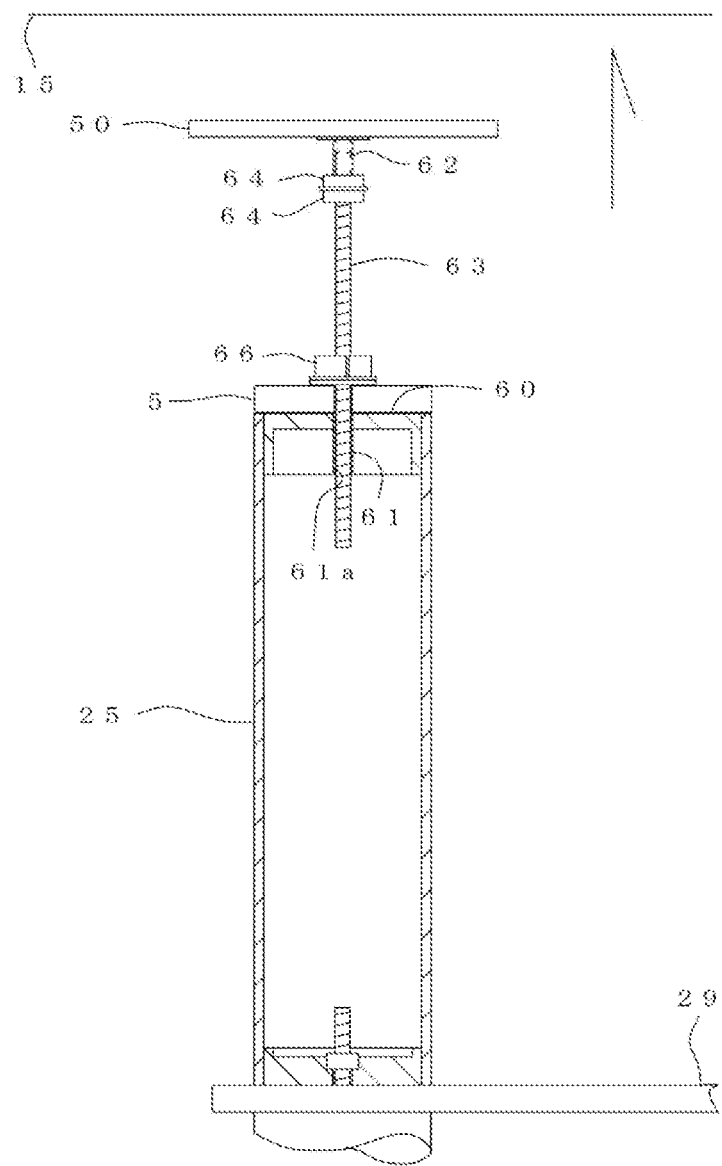
Figure 31:
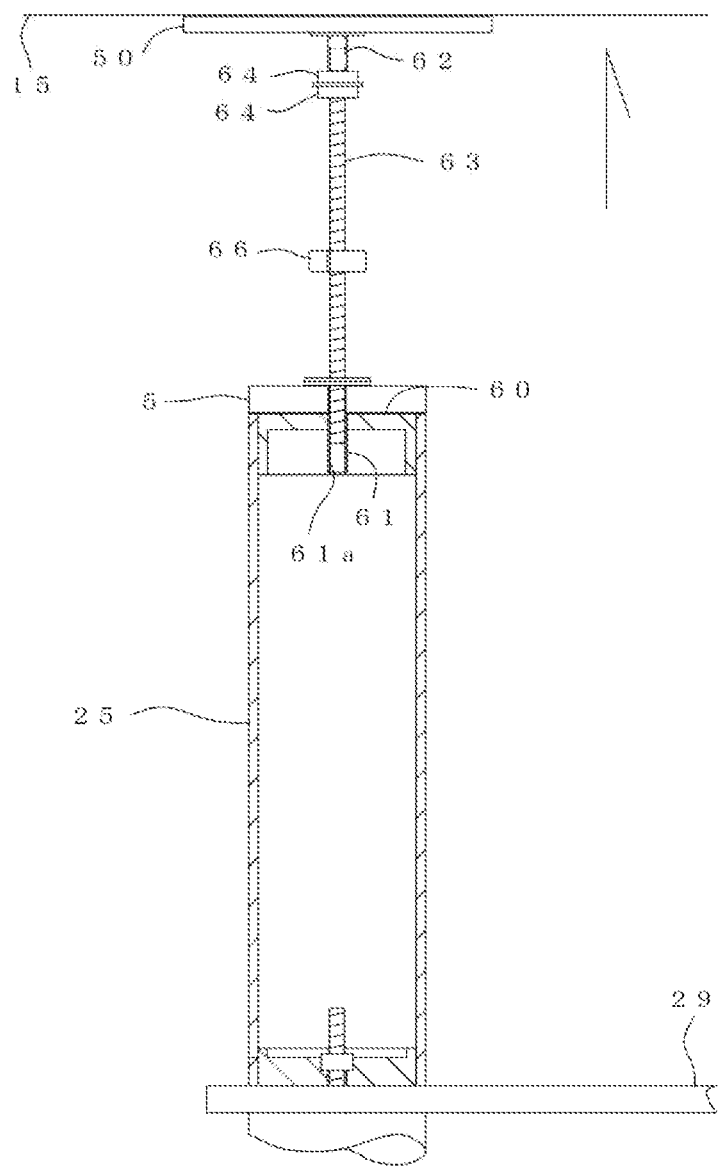
Figure 32:
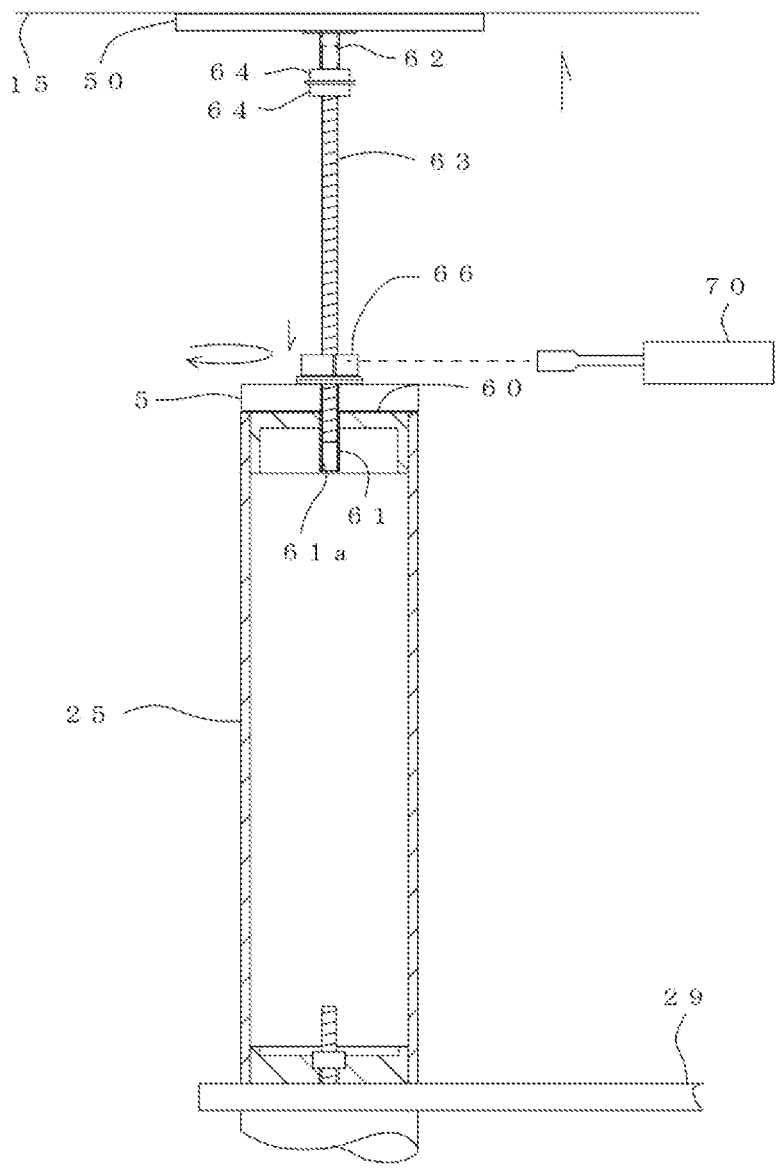

(1) in FIG. 27 is an exploded view of a top plate height adjustment unit in FIG. 26, and (2) and (3) in FIG. 27 are diagrams illustrating a method for assembling the top plate height adjustment unit;

FIG. 28 is a diagram illustrating the method for assembling the top plate height adjustment unit in FIG. 26;

FIG. 29 is a diagram illustrating the method for assembling the top plate height adjustment unit in FIG. 26;

FIG. 30 is a diagram illustrating a method for adjusting a height of a top plate in FIG. 26;

FIG. 31 is a diagram illustrating the method for adjusting the height of the top plate in FIG. 26; and FIG. 32 is a diagram illustrating the method for adjusting the height of the top plate in FIG. 26.

DETAILED DESCRIPTION OF THE EMBODIMENTS

Hereinafter, a best mode of the present invention will be described based on embodiments.

First Embodiment

Hereinafter, an embodiment of the present invention will be described with reference to FIGS. 12 to 25.

Figure 12:
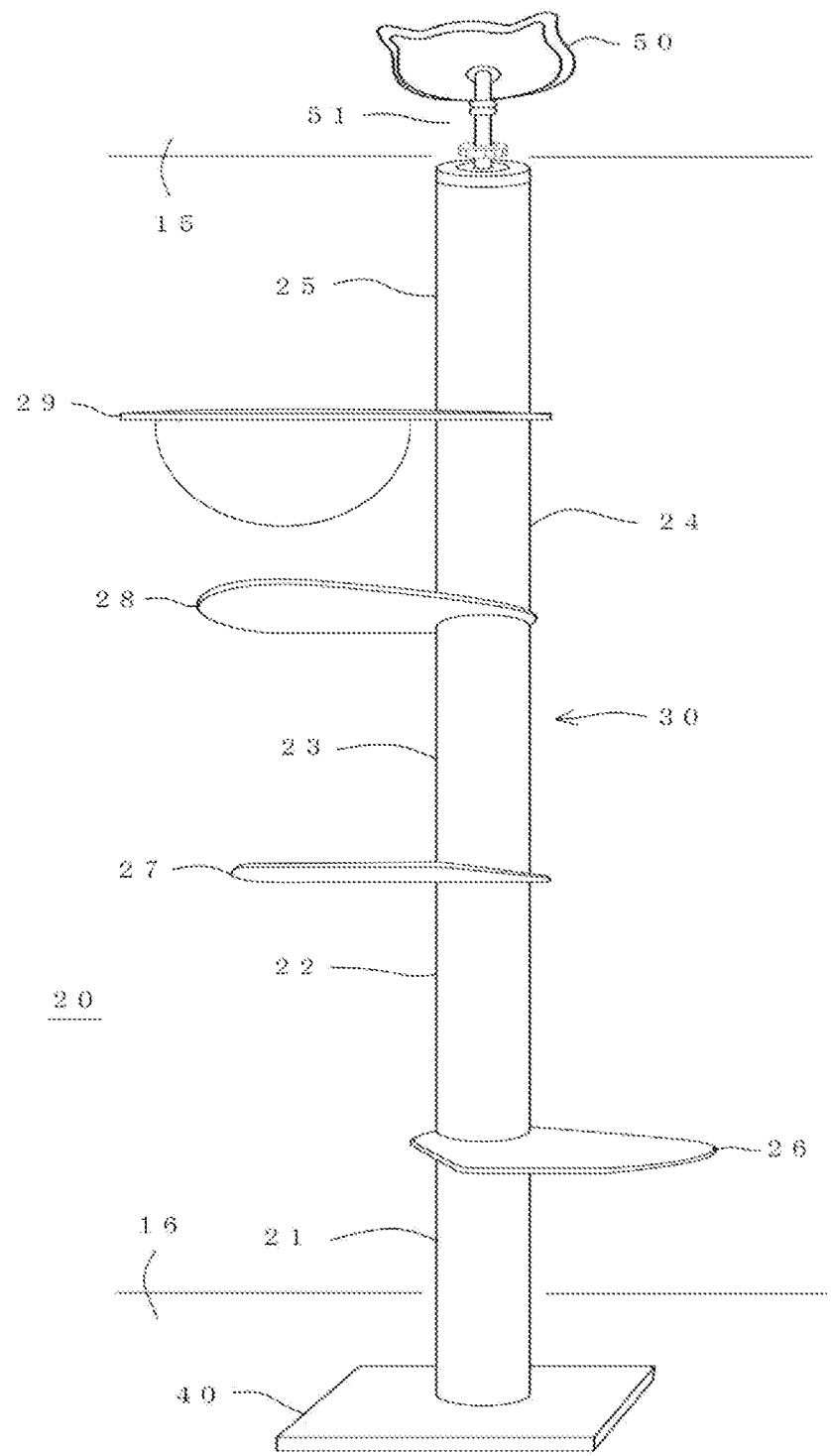
FIG. 12 is an external view of a cat tower according to an embodiment of the present invention.
Figure 13:
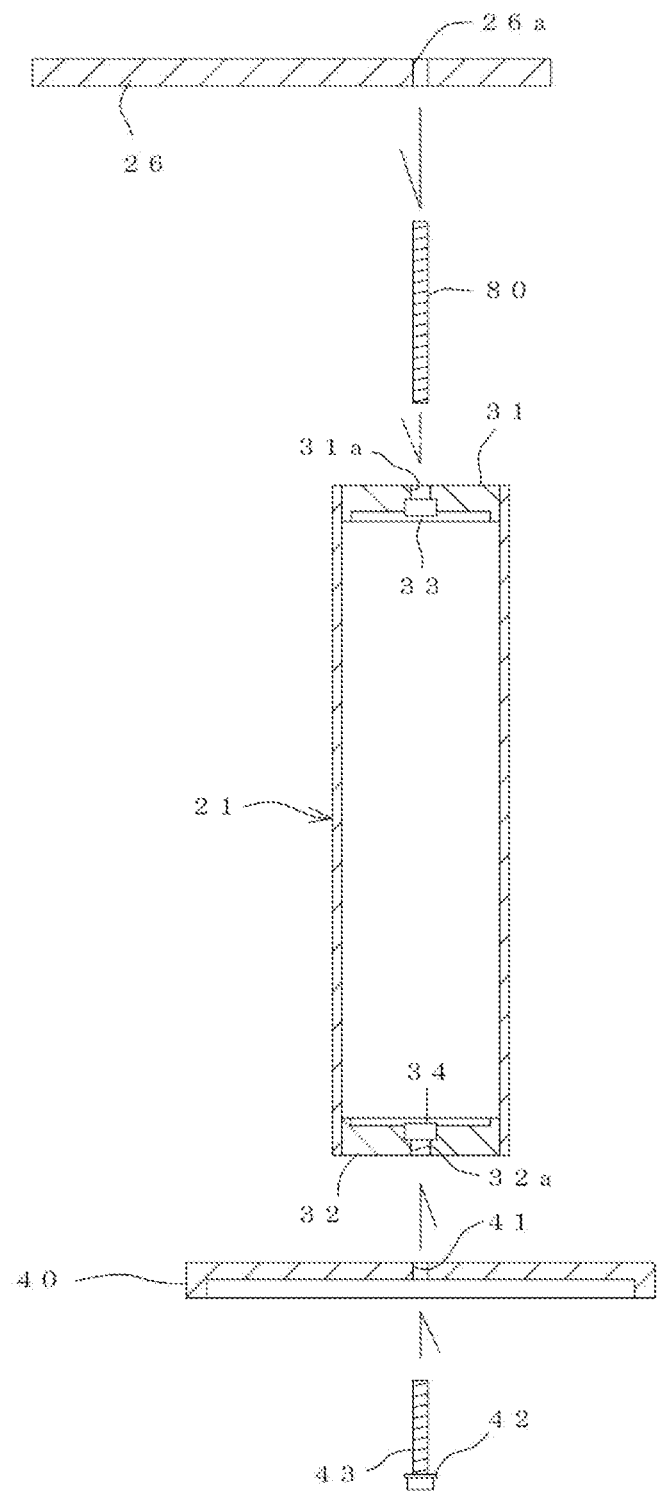
FIG. 13 is a diagram illustrating a method for assembling a lower portion in FIG. 12.
Figure 14:
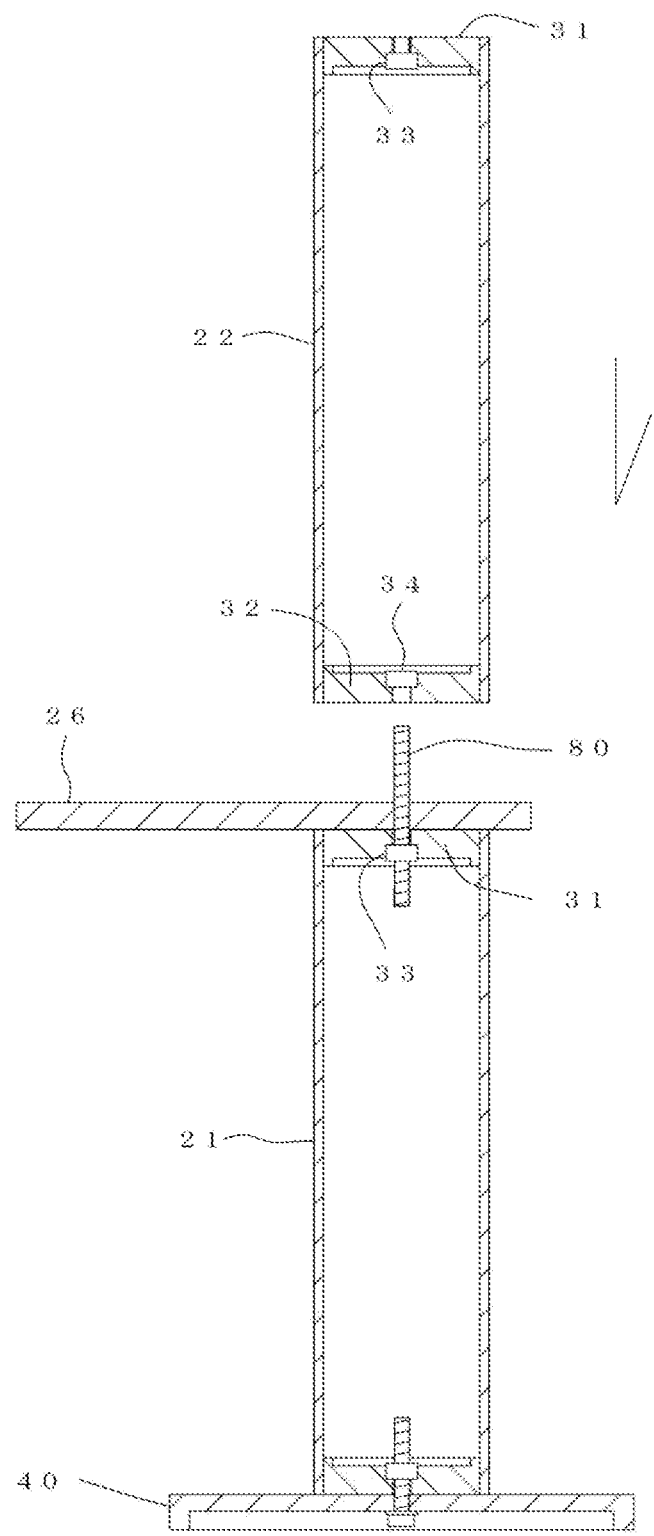
FIG. 14 is a diagram illustrating the method for assembling the lower portion in FIG. 12.
Figure 15:
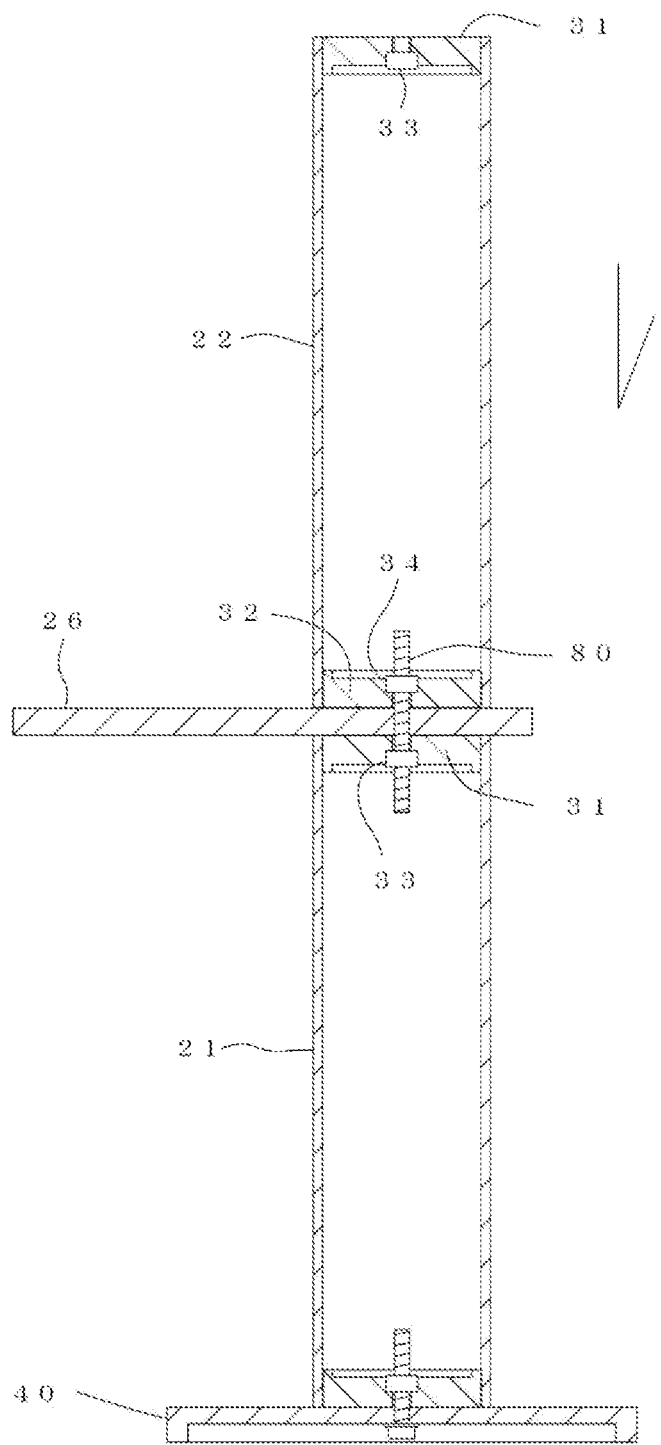
FIG. 15 is a diagram illustrating the method for assembling the lower portion in FIG. 12.
Figure 16:
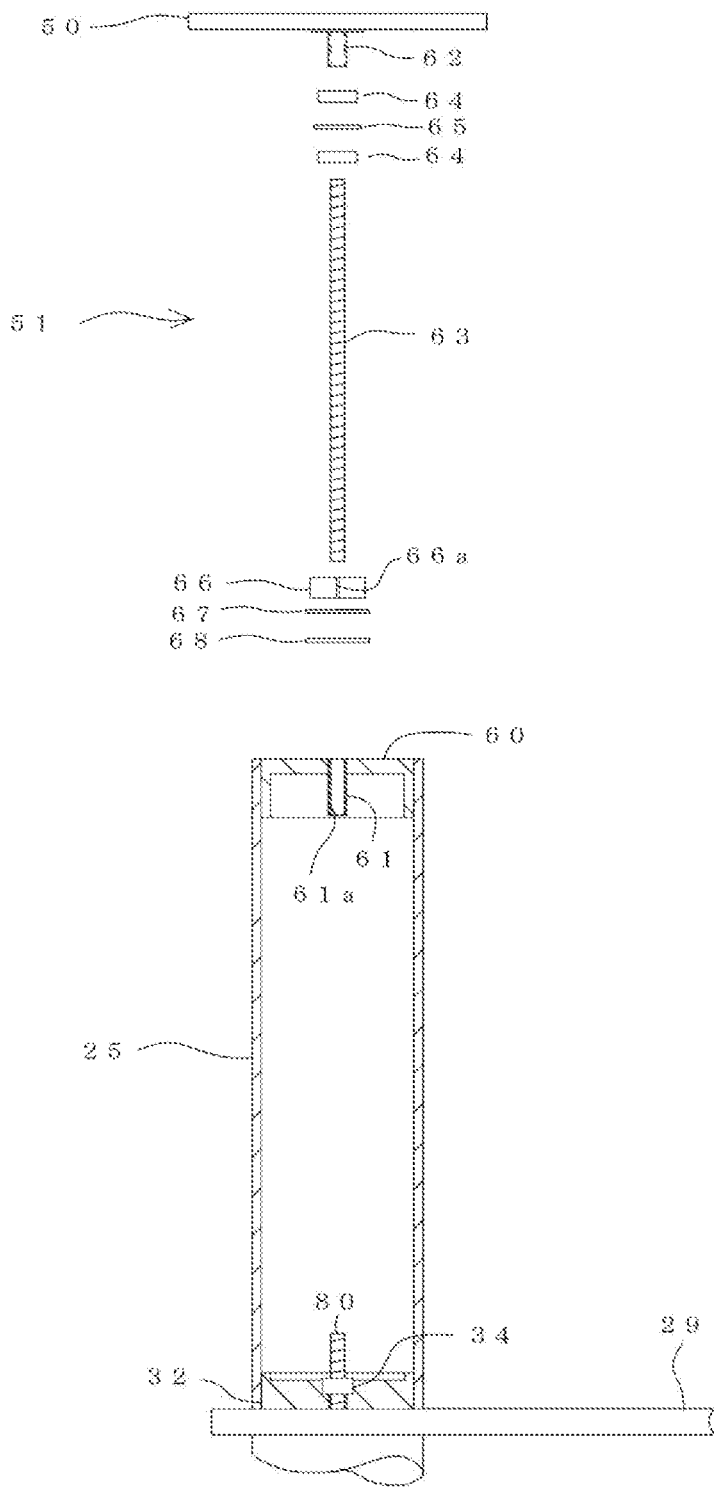
FIG. 16 is an exploded view of a top plate height adjustment unit in FIG. 12 and a cross-sectional view of a support member at an uppermost part.
Figure 17:
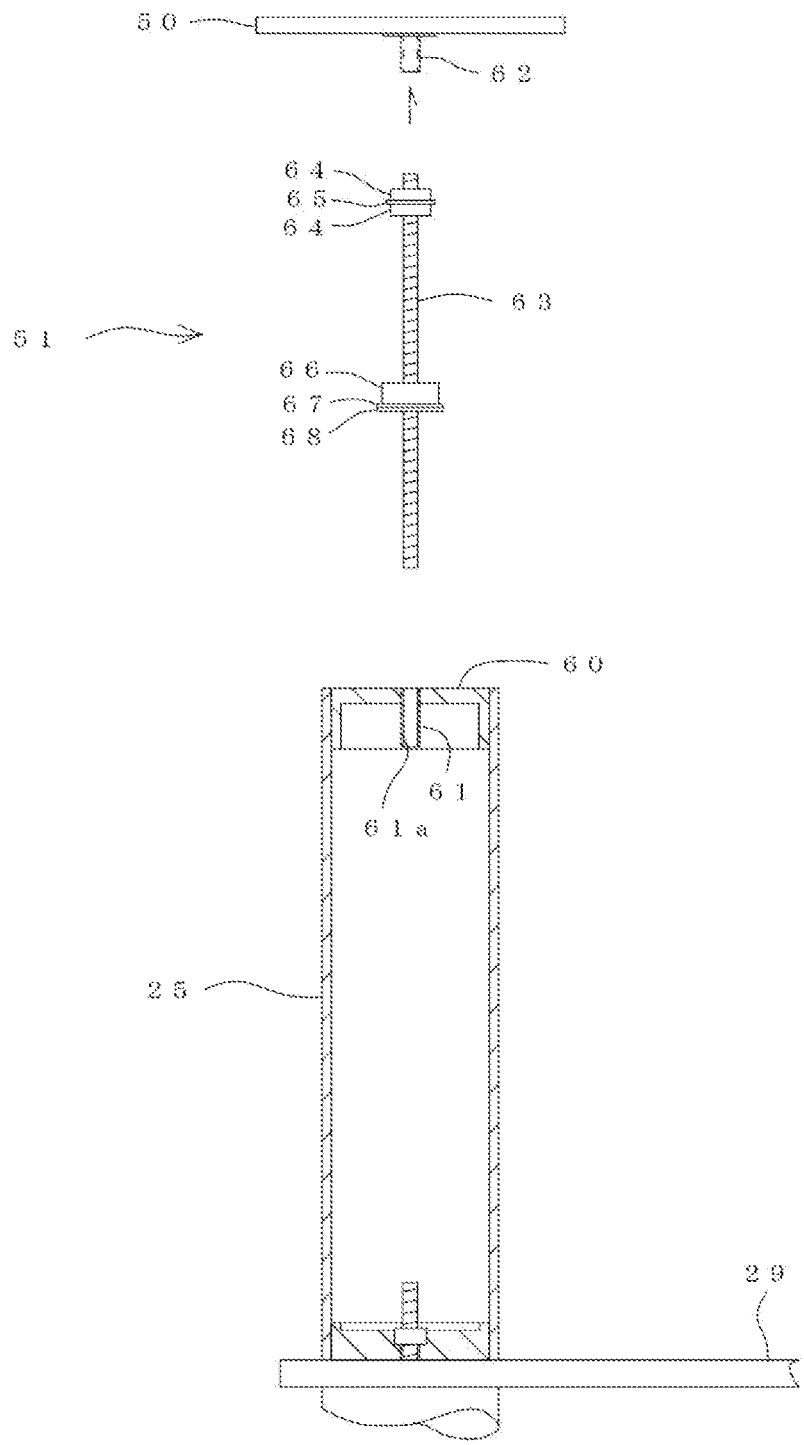
FIG. 17 is a diagram illustrating a method for assembling the top plate height adjustment unit in FIG. 12.
Figure 18:
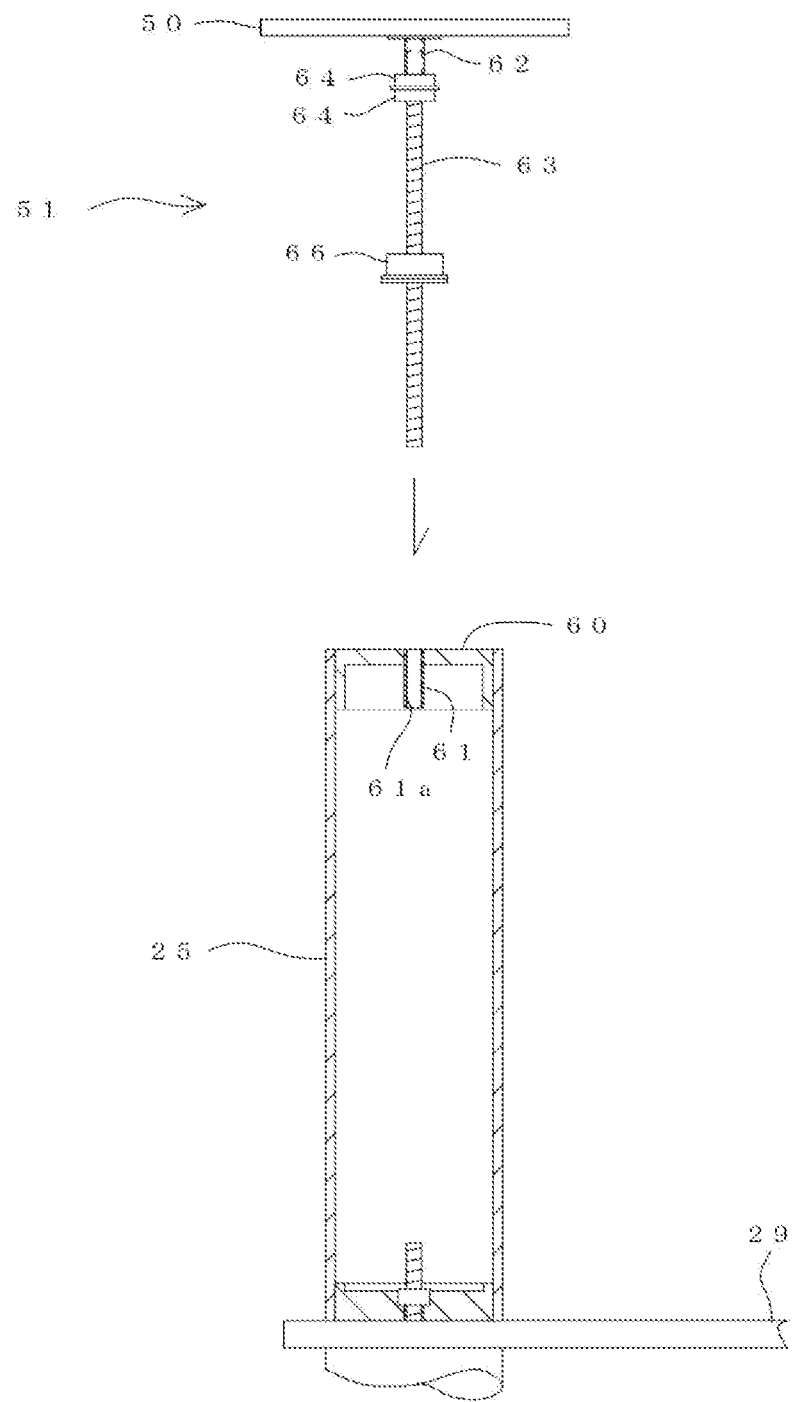
FIG. 18 is a diagram illustrating the method for assembling the top plate height adjustment unit in FIG. 12.
Figure 19:
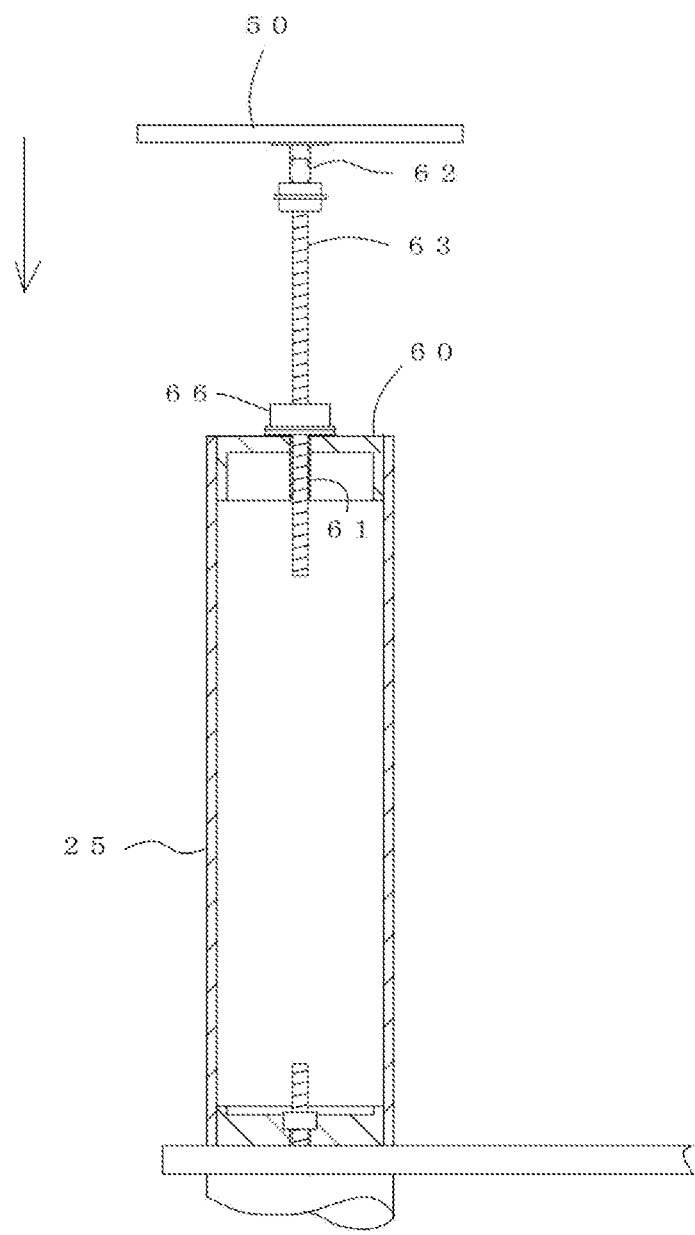
FIG. 19 is a diagram illustrating the method for assembling the top plate height adjustment unit in FIG. 12.
Figure 20:
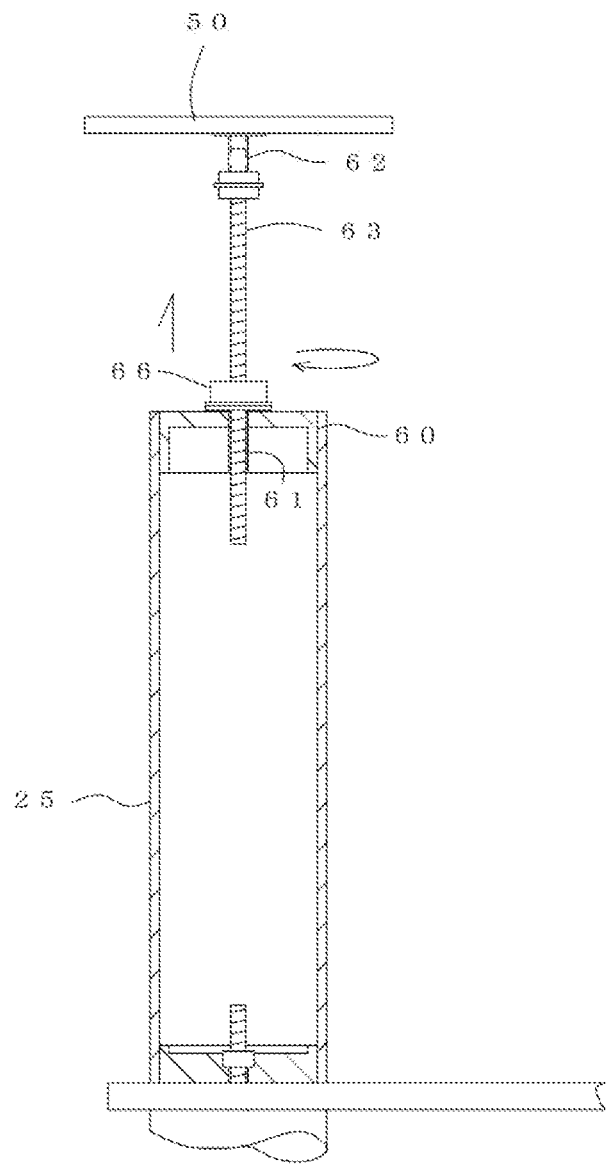
FIG. 20 is a diagram illustrating a method for adjusting a height of a top plate in FIG. 12.

FIG. 12 is an external view of a cat tower according to the embodiment of the present invention, FIGS. 13 to 15 are diagrams illustrating a method for assembling a lower portion of the cat tower, FIG. 16 is an exploded view of a top plate height adjustment unit in FIG. 12, FIGS. 17 to 19 are diagrams illustrating a method for assembling an upper portion of the cat tower, and FIGS. 20 to 25 are diagrams illustrating a method for adjusting a height of a top plate.

Figure 1:
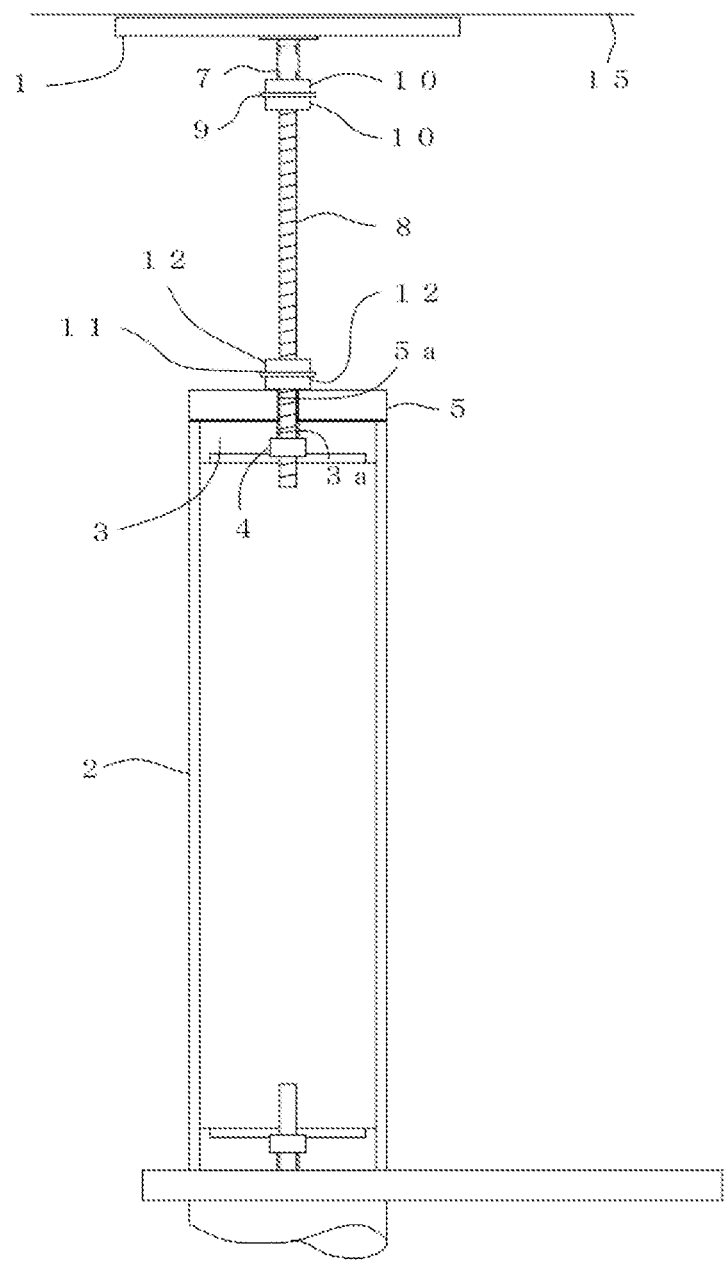
FIG. 1 is a cross-sectional view in which a part of an upper portion of a cat tower in the related art is omitted.

In the present embodiment, an example in which an upper end plate 5 in FIG. 1 is omitted will be described.

In FIG. 12, a reference numeral 20 represents a cat tower that is installed indoors to allow a cat to climb and play indoors. The cat tower 20 includes a support 30 formed by vertically and linearly connecting five cylindrical support members 21 to 25 which sandwich teardrop-shaped tables 26 to 28 and a spaceship hammock plate 29 with a hemispherical transparent capsule, a rectangular base 40 attached to a lower end of the support member 21 at a lowest part of the support 30, a top plate 50 provided on an upper end side of the support member 25 at an uppermost part of the support 30, and a top plate height adjustment unit 51 provided between the support member 25 and the top plate 50.

A structure and an assembly method of a lower portion of the support 30 will be described with reference to FIGS. 13 to 15. In each of the cylindrical support members 21, 22, 23, 24, low-height cylindrical lid members 31, 32 made of plastic are respectively fitted to upper and lower end portions, and female thread fittings 33, 34 implemented by nuts are respectively attached to back sides of holes 31a, 32a formed in centers of the lid members 31, 32. As shown in FIG. 16, in the cylindrical support member 25 at the uppermost part, a high-height cylindrical lid member 60 made of plastic is fitted to an upper end portion, a low-height cylindrical lid member 34 made of plastic is fitted to a lower end portion, and a cylindrical and elongated thread through fitting 61 serving as an unthreaded hole portion is attached at a center of the lid member 60 on an upper side.

After a bolt 43 is inserted into a hole 41 in a center of the rectangular base 40 from below with a washer 42 sandwiched, the base 40 is fixed to the lower end of the support member 21 by screwing a male thread of the bolt 43 into the female thread fitting 34 (see FIGS. 13 and 14).

After a lower portion of a short thread 80 is screwed into the female thread fitting 33 of the lid member 31 at the upper end of the support member 21, a hole 26a formed near one end of the table 26 is passed through the short thread 80 from above. The female thread fitting 34 of the lid member 32 at the lower end of the support member 22 at a second part is screwed into an upper portion exposed above the short thread 80, so that the support members 21 and 22 are linearly connected with the table 26 sandwiched (see FIGS. 14 and 15). Similarly, on the support member 22, the support members 23, 24, 25 are connected with the tables 27, 28 and the spaceship hammock plate 29 sandwiched, so that the long linear support 30 is formed (see FIG. 12).

The top plate 50 is made of wood, and an adjustment fitting 62 as a female thread fitting is attached to a center of a lower surface of the top plate 50 in a manner of protruding downward. The adjustment fitting 62 is a bottomed fitting with a female thread.

A height of the top plate 50 with respect to the support member 25 can be adjusted by the top plate height adjustment unit 51 provided between the support member 25 at the uppermost part and the top plate 50. Specifically, as shown in FIG. 16, the top plate height adjustment unit 51 includes an elongated thread 63, two first nuts 64, 64 provided at an upper portion of the elongated thread 63, a spring washer 65, and one second nut 66, a spring washer 67, and a washer 68 which have large diameters and are provided at a lower portion of the elongated thread 63. In the second nut 66, an inner side is made of a metal member, an outer side is a plastic member that can be grasped by a hand, and grooves 66a in a vertical direction are formed on a circumferential side surface at three locations spaced apart by 120 degrees in a circumferential direction. By inserting a flathead screwdriver into the groove 66a, the second nut 66 can be rotated about an axis.

The upper portion of the elongated thread 63 can be screwed into the adjustment fitting 62 of the top plate 50, while the lower portion of the elongated thread 63 can be inserted into an unthreaded through hole 61a of the thread through fitting 61 attached to the lid member 60 fitted to the upper end portion of the support member 25 at the uppermost part. The thread through fitting 61 has no female thread that is screwed to the elongated thread 63, and is freely and straight inserted and removed in an axial direction without turning the elongated thread 63.

Next, a method for assembling an upper portion of the cat tower 20 and a method for adjusting the height of the top plate 50 will be described with reference to FIGS. 17 to 25.

First, the two first nuts 64 are screwed onto the upper portion of the elongated thread 63 with the spring washer 65 sandwiched in advance, the second nut 66 is screwed onto the lower portion, the spring washer 67 and the washer 68 are fitted, and an upper end portion of the elongated thread 63 is screwed into the adjustment fitting 62 of the top plate 50. Then, the first nuts 64, 64 are turned with a spanner, and tightened and strongly pressed against an adjustment fitting 62 side, and the top plate 50 and the top plate height adjustment unit 51 are integrated (see FIGS. 17 and 18).

Next, the lower end portion of the elongated thread 63 with the top plate 50 attached is inserted into the unthreaded through hole 61a of the thread through fitting 61 provided at the center of the lid member 60 at the upper end portion of the support member 25 at the uppermost part, which is placed horizontally on the floor. The second nut 66 comes into contact with the lid member 60 with the spring washer 67 and the washer 68 sandwiched. In this case, since the unthreaded through hole 61a does not have a female thread that is screwed to the elongated thread 63, it is sufficient to simply insert the lower portion of the elongated thread 63 straight in the axial direction into the unthreaded through hole 61a of the thread through fitting 61 without turning the top plate 50 together with the elongated thread 63 about the axis many times (see FIGS. 18 and 19).

Figure 21:
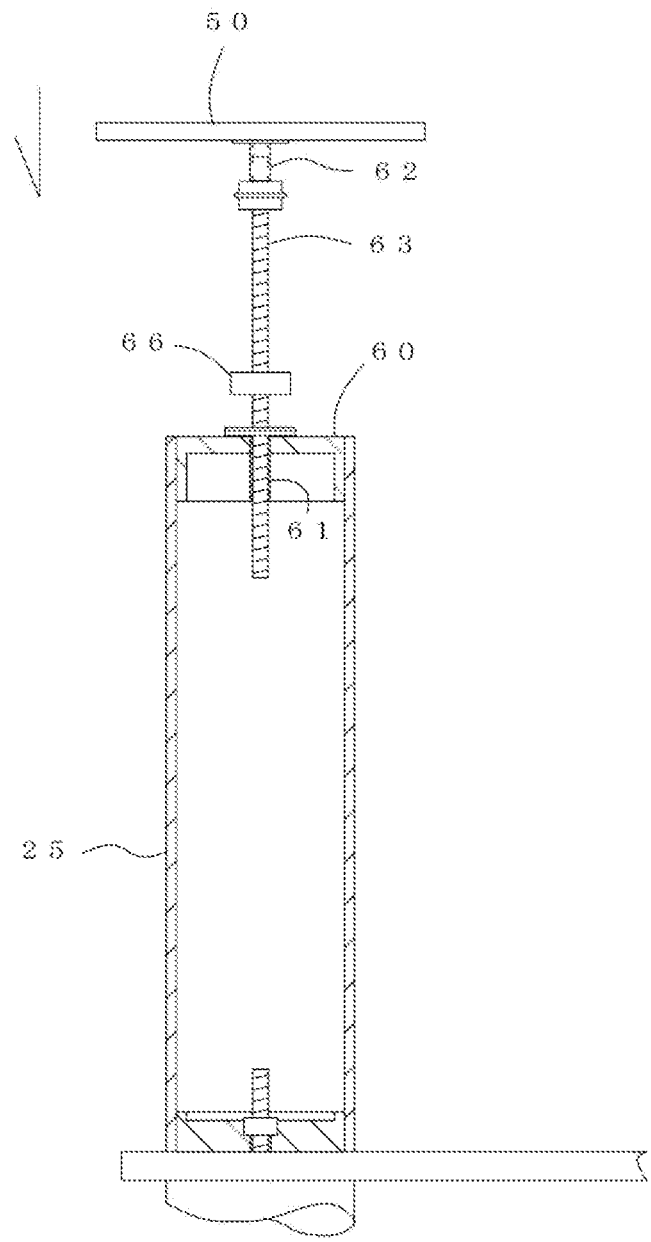
FIG. 21 is a diagram illustrating a method for adjusting the height of the top plate in FIG. 12.
Figure 22:
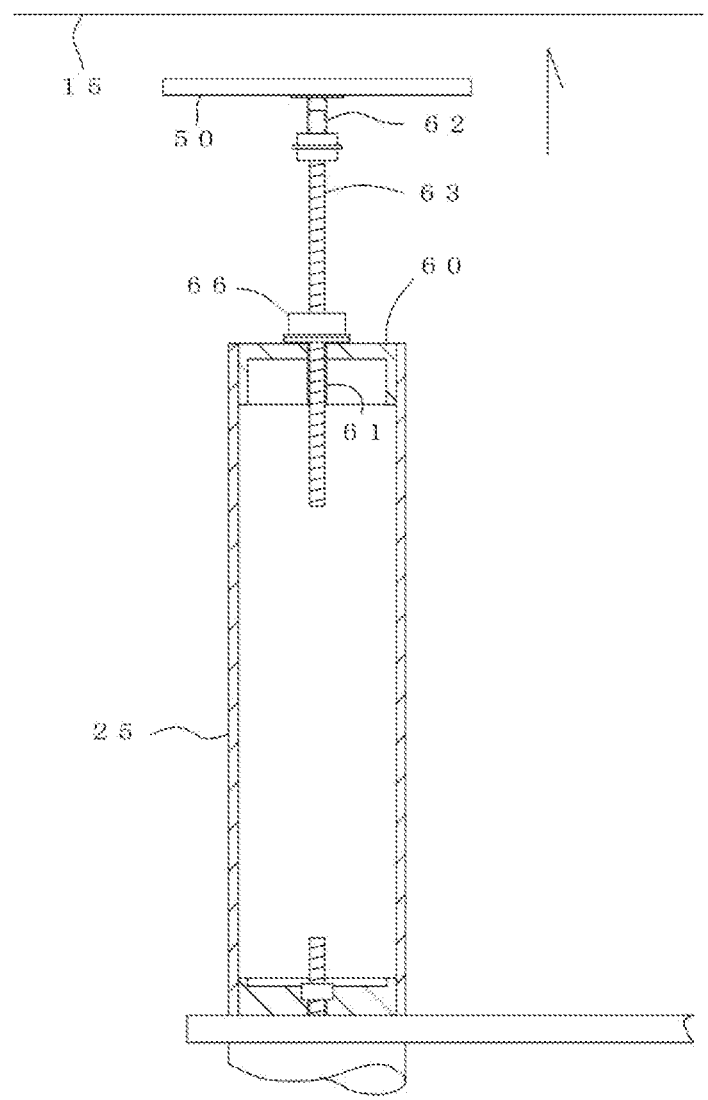
FIG. 22 is a diagram illustrating the method for adjusting the height of the top plate in FIG. 12.
Figure 23:
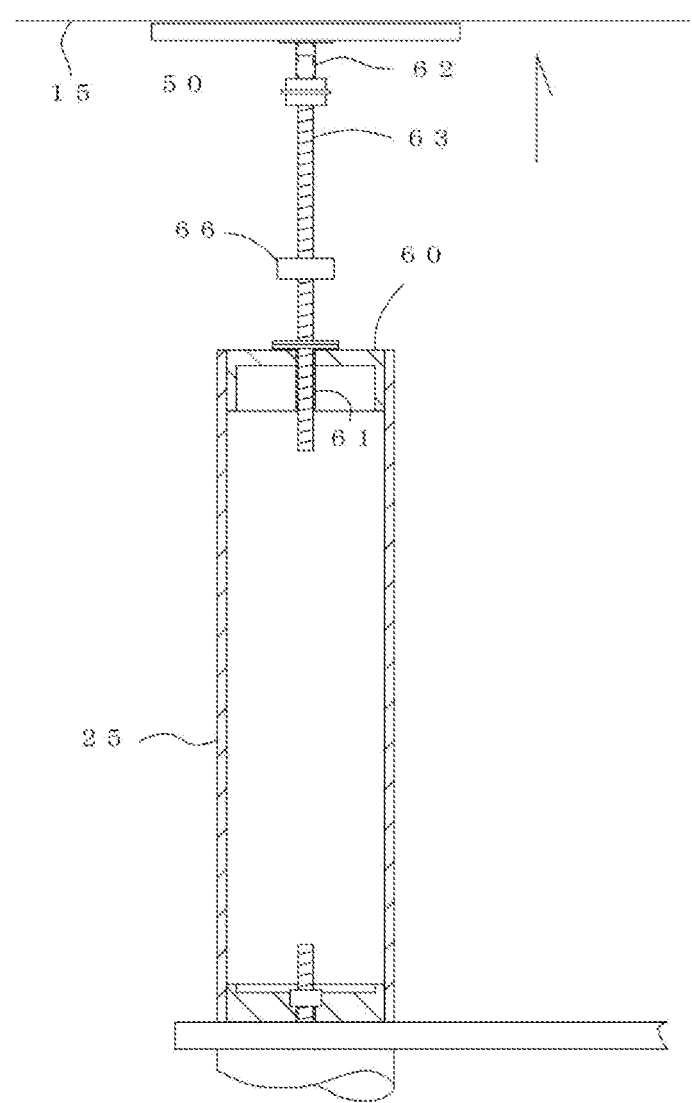
FIG. 23 is a diagram illustrating the method for adjusting the height of the top plate in FIG. 12.
Figure 24:
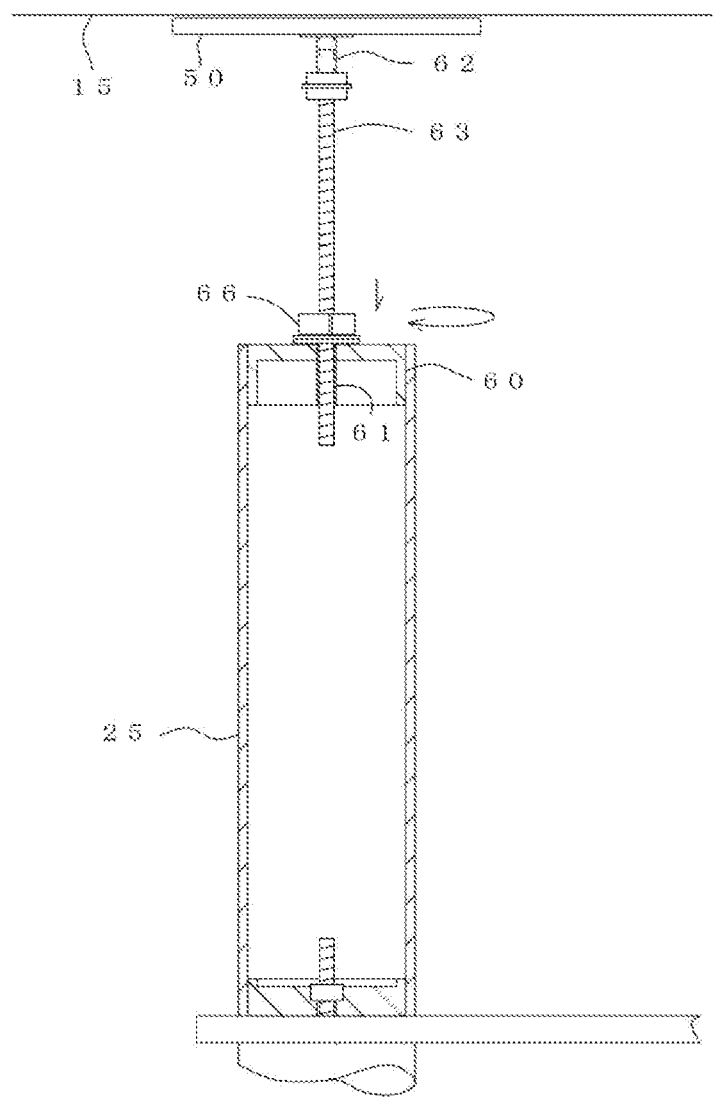
FIG. 24 is a diagram illustrating the method for adjusting the height of the top plate in FIG. 12.
Figure 25:
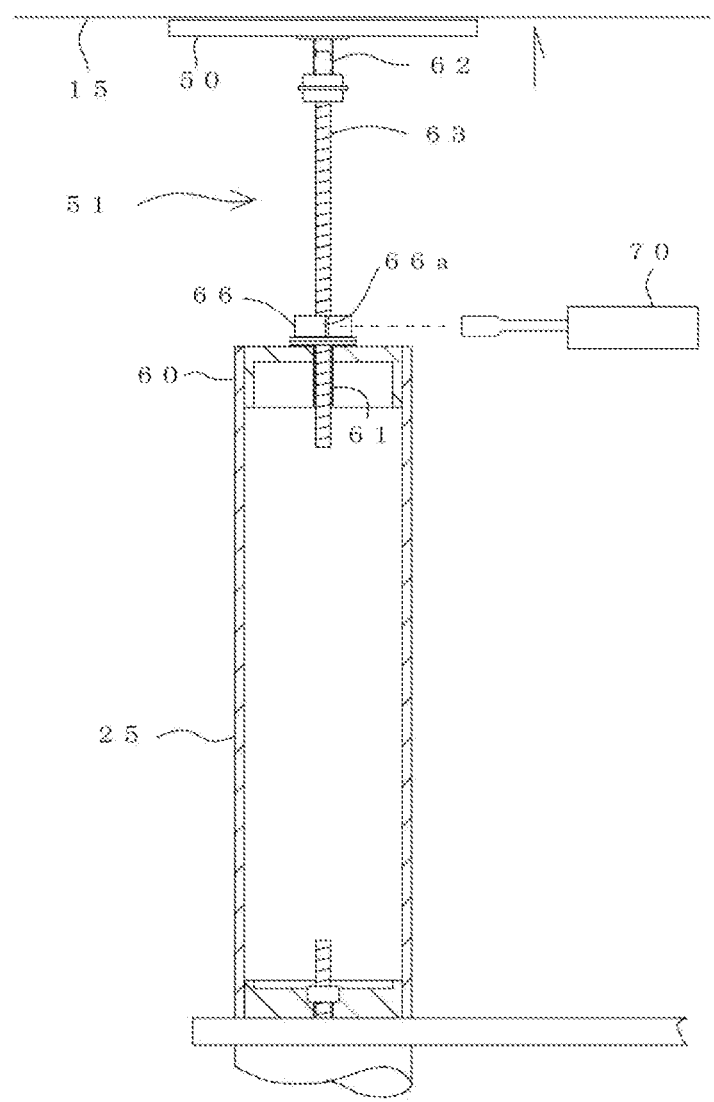
FIG. 25 is a diagram illustrating the method for adjusting the height of the top plate in FIG. 12.

If a distance between the top plate 50 and the upper end of the support member 25 is too large, and the top plate 50 is likely to collide with the ceiling 15 (see FIG. 12) when the cat tower 20 is erected, the second nut 66 is turned to move to the upper portion of the elongated thread 63 (see FIG. 20), and then the top plate 50 can descend together with the elongated thread 63 (see FIG. 21).

In a state where the top plate 50 is at an appropriate height where the top plate 50 does not abut the ceiling 15, the cat tower 20 is erected on a floor 16 (see FIG. 12) with the base 40 put down, and an operator stands on a stepladder to pull up the top plate 50 together with the elongated thread 63 from the upper end portion of the support member 25 at the uppermost part, and to pull out the lower portion of the elongated thread 63 upward from the unthreaded through hole 61a. In this case, since the unthreaded through hole 61a does not have a female thread, it is sufficient to simply pull out the top plate 50 straight without turning the top plate 50 about the axis many times (see FIG. 22). As the top plate 50 moves upward, the second nut 66 also moves upward.

When the top plate 50 comes into contact with the ceiling 15 (see FIG. 23), the second nut 66 is turned by a hand to move to the lower portion of the elongated thread 63, is tightened to the upper end side of the support member 25 at the uppermost part, and is pressed against the lid member 60 with the spring washer 67 and the washer 68 sandwiched. Accordingly, the top plate 50 presses against the ceiling 15 upward due to a reaction (see FIG. 24).

Finally, a flathead screwdriver 70 is inserted into the vertical grooves 66a formed at three locations on the circumferential side surface of the nut 66 and is turned to further tighten the nut (see FIG. 25), the top plate 50 is strongly pressed against the ceiling 15, and the cat tower 20 is firmly fixed and installed between the floor 16 and the ceiling 15. Accordingly, the top plate 50 can be easily locked to the ceiling 15.

According to the present embodiment, the thread through fitting 61 without a female thread is provided in the center of the lid member 60 fitted to the upper end portion of the support member 25 at the uppermost part, the elongated thread 63 of the top plate height adjustment unit 51 can be inserted into and removed from the thread through fitting 61 straight in the axial direction without being turned about the axis, and when the cat tower 20 is installed between the floor 16 and the ceiling 15, the upper end portion of the elongated thread 63 whose upper portion is screwed by the first nut 64 and whose lower portion is screwed by the second nut 66 is screwed in advance into the adjustment fitting 62 as a female thread fitting on the lower surface of the top plate 50, the first nut 64 is tightened and the adjustment fitting 62 is pressed to integrate the top plate 50 and the elongated thread 63 in advance, and the lower portion of the elongated thread 63 with the top plate 50 attached is straight inserted, without turning, into the unthreaded through hole 61a of the thread through fitting 61 provided at the upper end of the support member 25 at the uppermost part in advance. After erecting the cat tower 20 vertically, the operator stands on the stepladder to pull up the top plate 50 straight together with the elongated thread 63 from the upper end portion of the support member 25 at the uppermost part without rotating the top plate 50 about the axis. When the top plate 50 comes into contact with the ceiling 15, the second nut 66 is turned to move to the lower portion of the elongated thread 63 and is pressed against the upper end side of the support member 25 at the uppermost part, and if the top plate 50 is pressed against the ceiling 15 by a reaction, the top plate 50 is easily locked to the ceiling 15, and thus it is unnecessary to turn the top plate 50 together with the elongated thread 63 many times to adjust the height of the top plate 50, and the installation operation can be easily performed in a short time.

Figure 2:
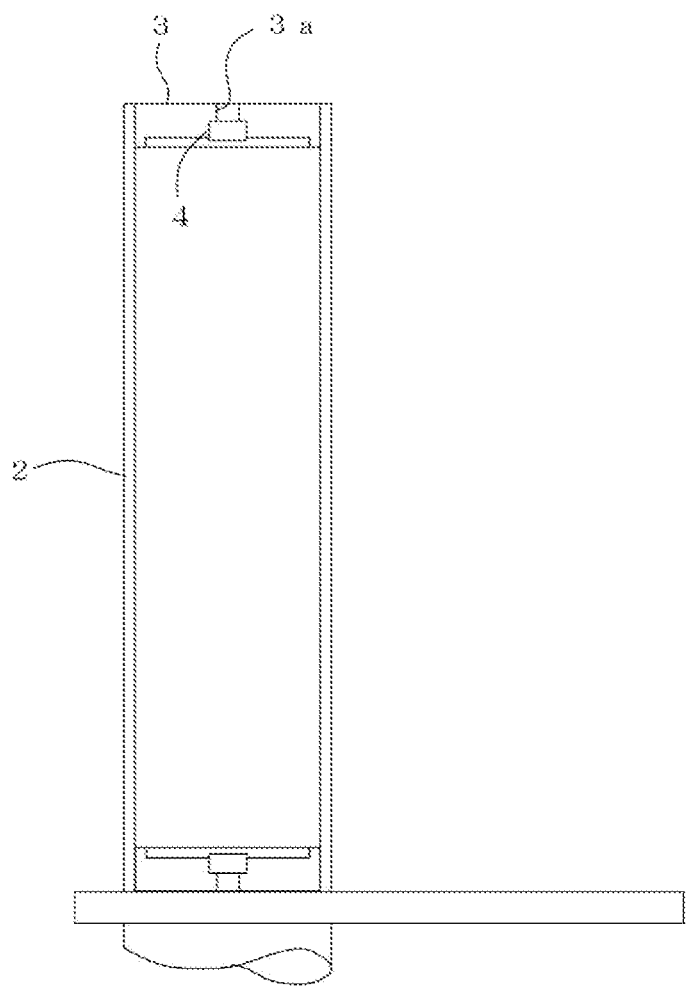
FIG. 2 is a cross-sectional view of a support member in FIG. 1.
Figure 3:
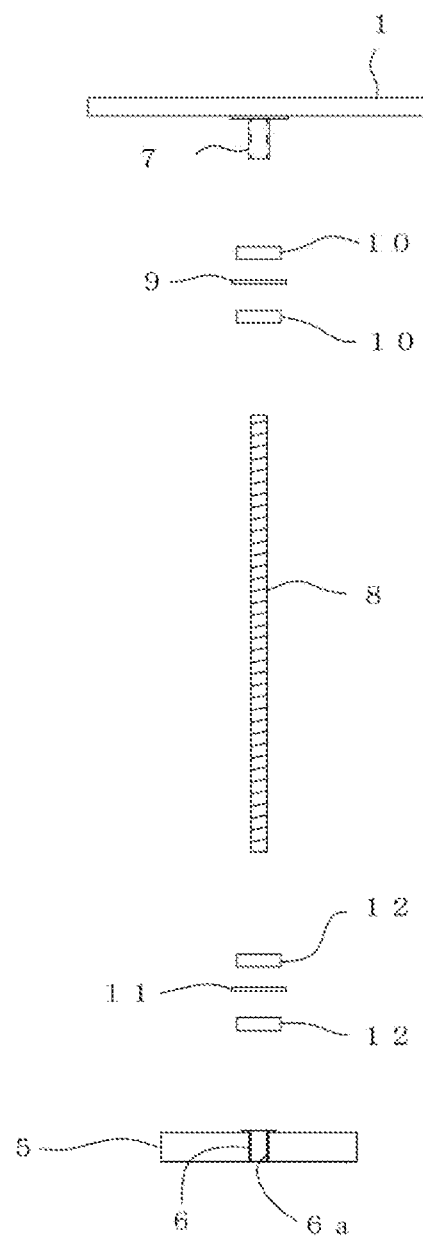
FIG. 3 is an exploded view of a top plate height adjustment unit in FIG. 1.
Figure 4:
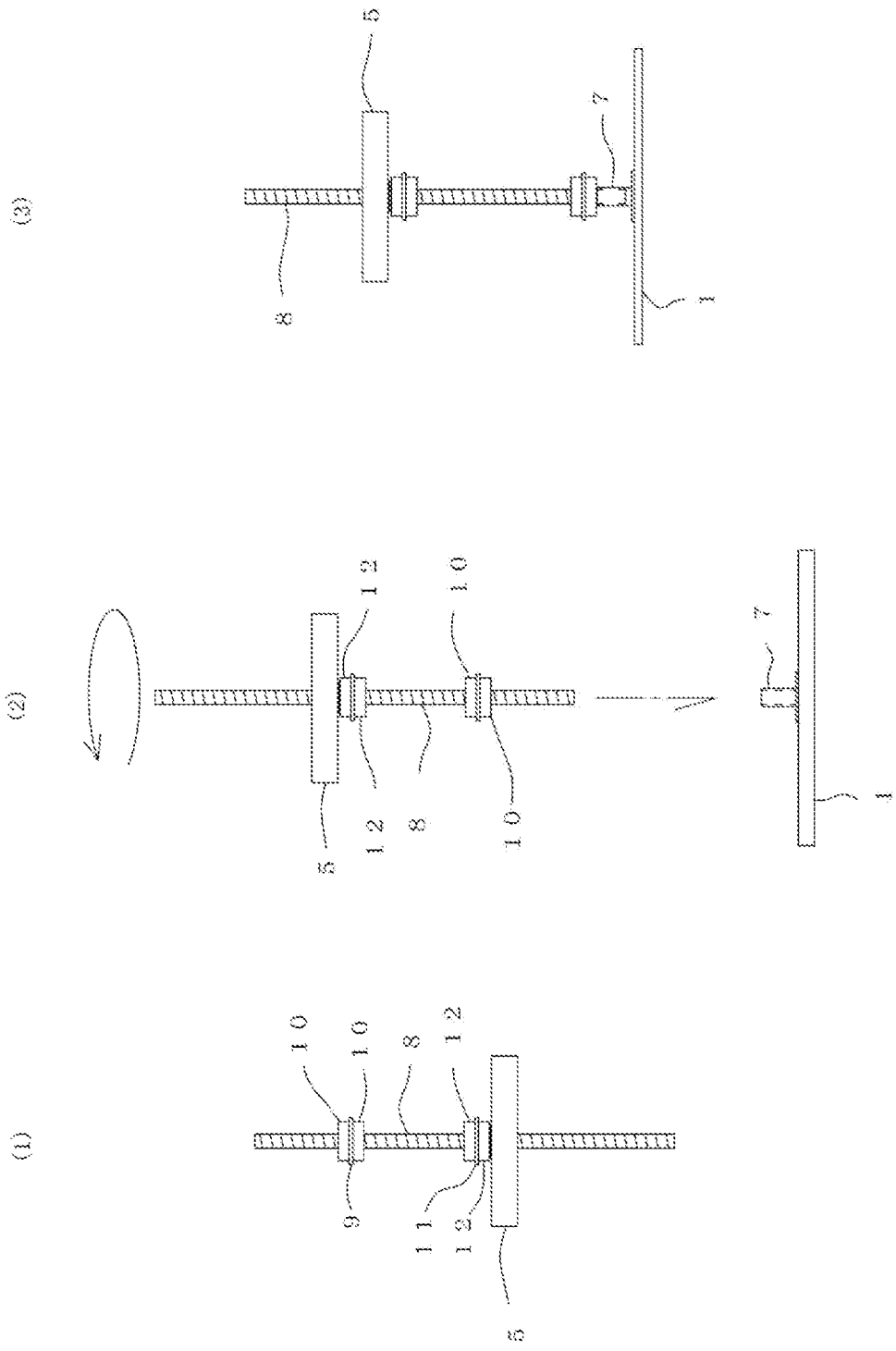
FIG. 4 is a diagram illustrating a method for assembling the top plate height adjustment unit in FIG. 1.
Figure 5:
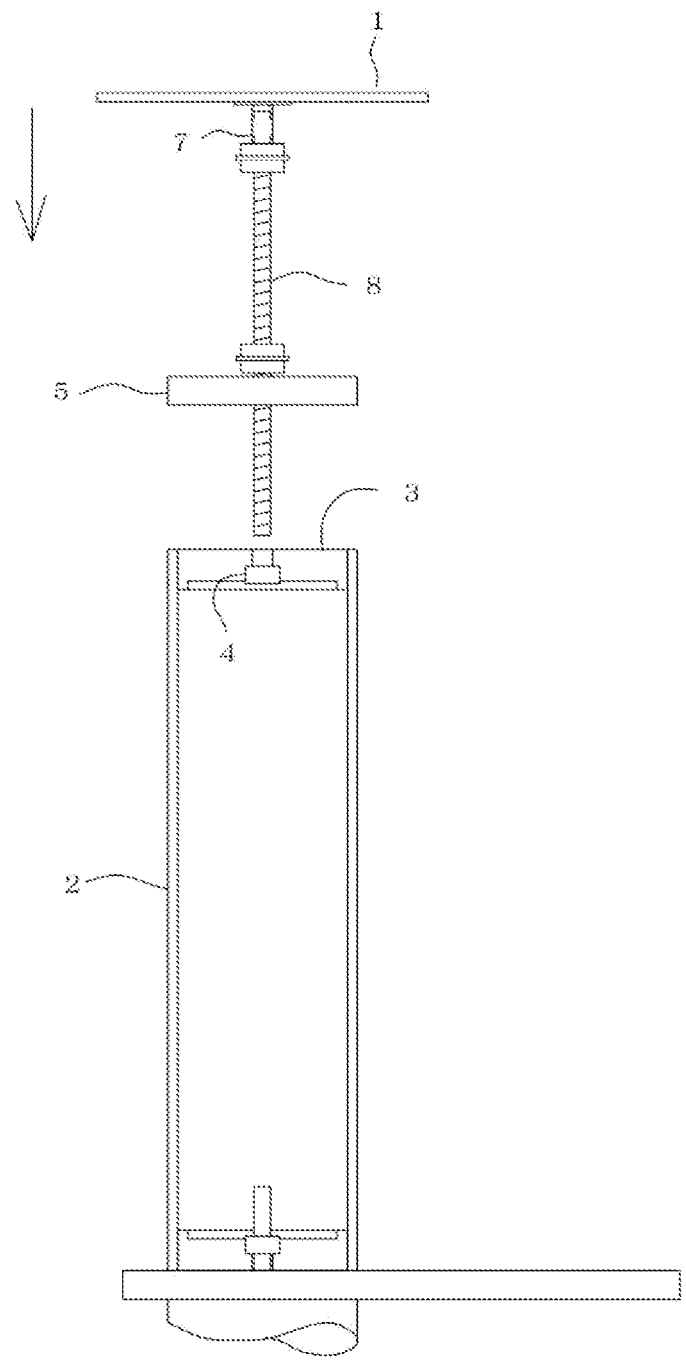
FIG. 5 is a diagram illustrating the method for assembling the top plate height adjustment unit in FIG. 1.
Figure 6:
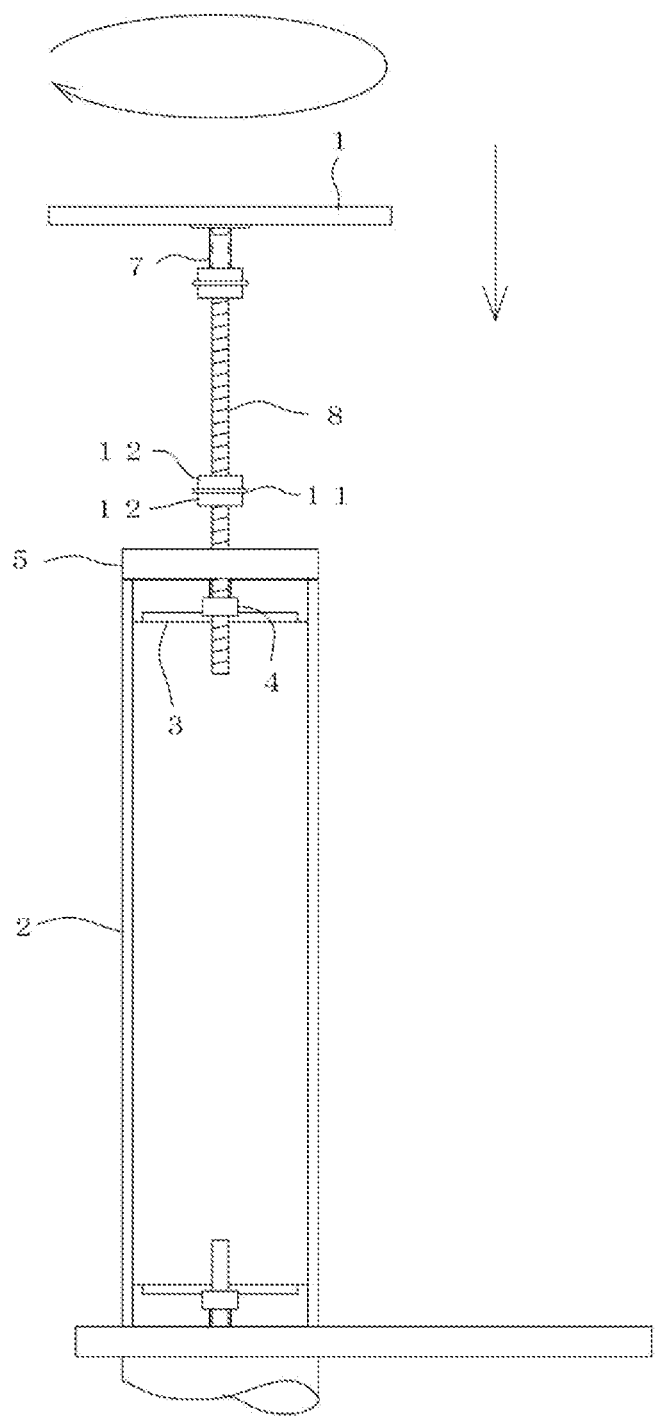
FIG. 6 is a diagram illustrating the method for assembling the top plate height adjustment unit in FIG. 1.
Figure 7:
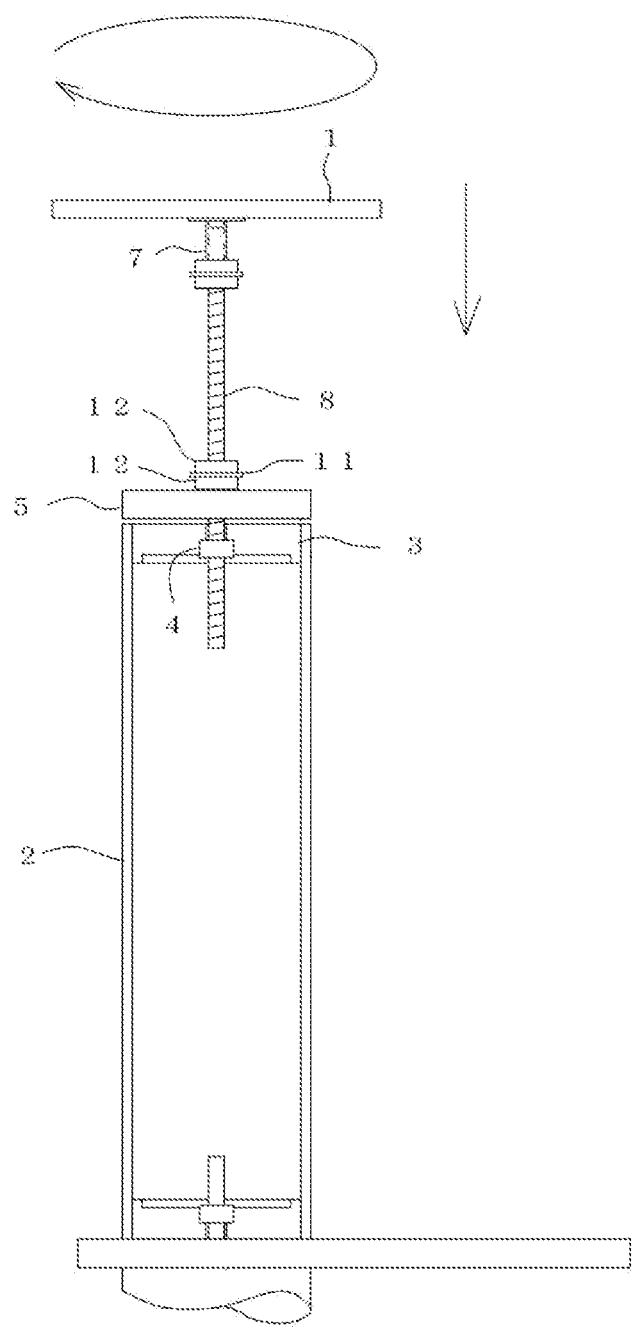
FIG. 7 is a diagram illustrating the method for assembling the top plate height adjustment unit in FIG. 1.
Figure 8:
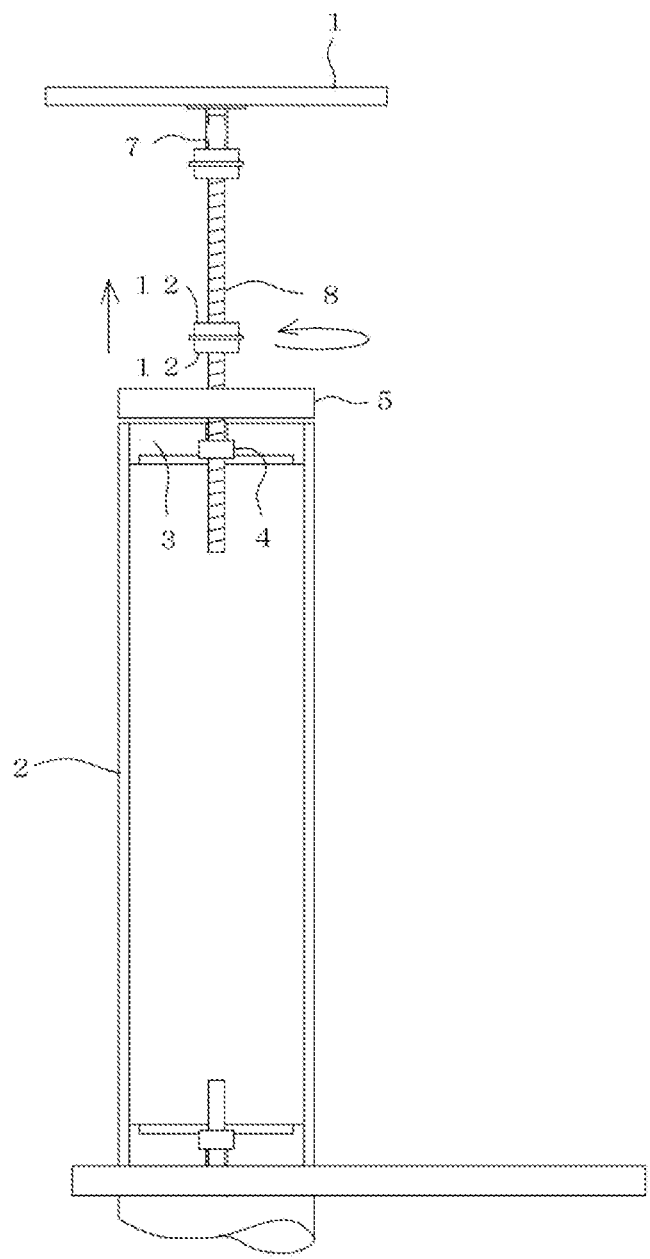
FIG. 8 is a diagram illustrating the method for assembling the top plate height adjustment unit in FIG. 1.
Figure 9:
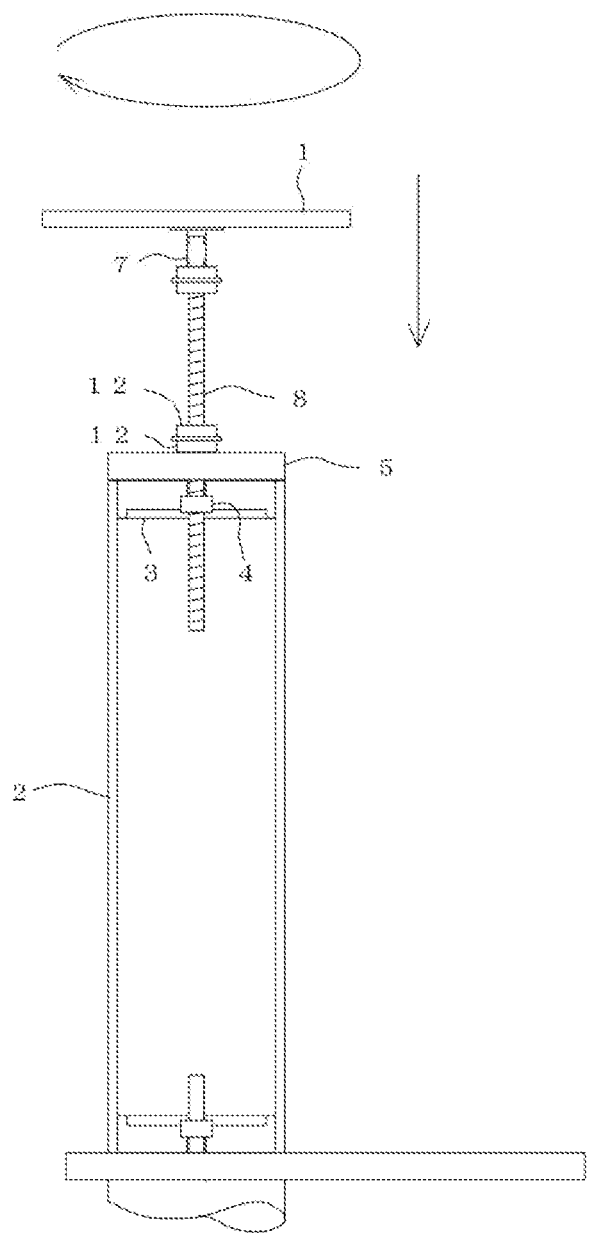
FIG. 9 is a diagram illustrating the method for assembling the top plate height adjustment unit in FIG. 1.
Figure 10:
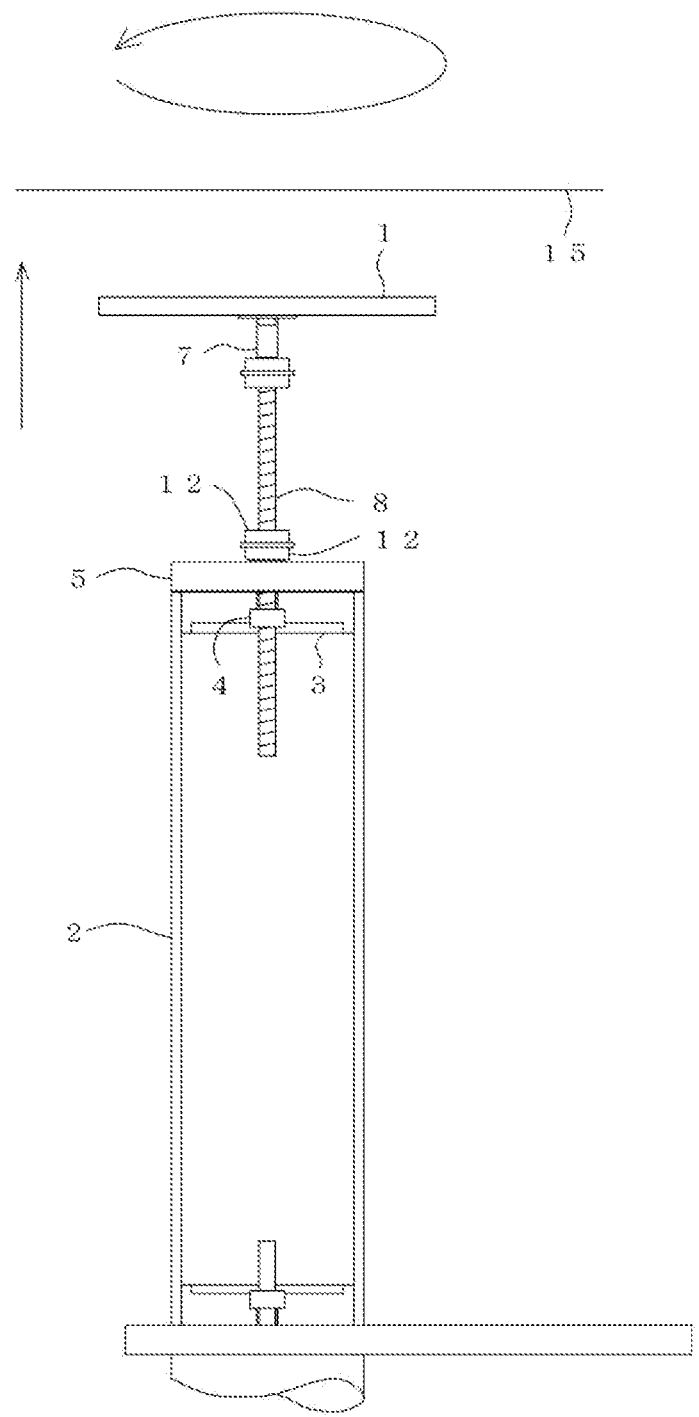
FIG. 10 is a diagram illustrating a method for adjusting a height of a top plate in FIG. 1.
Figure 11:
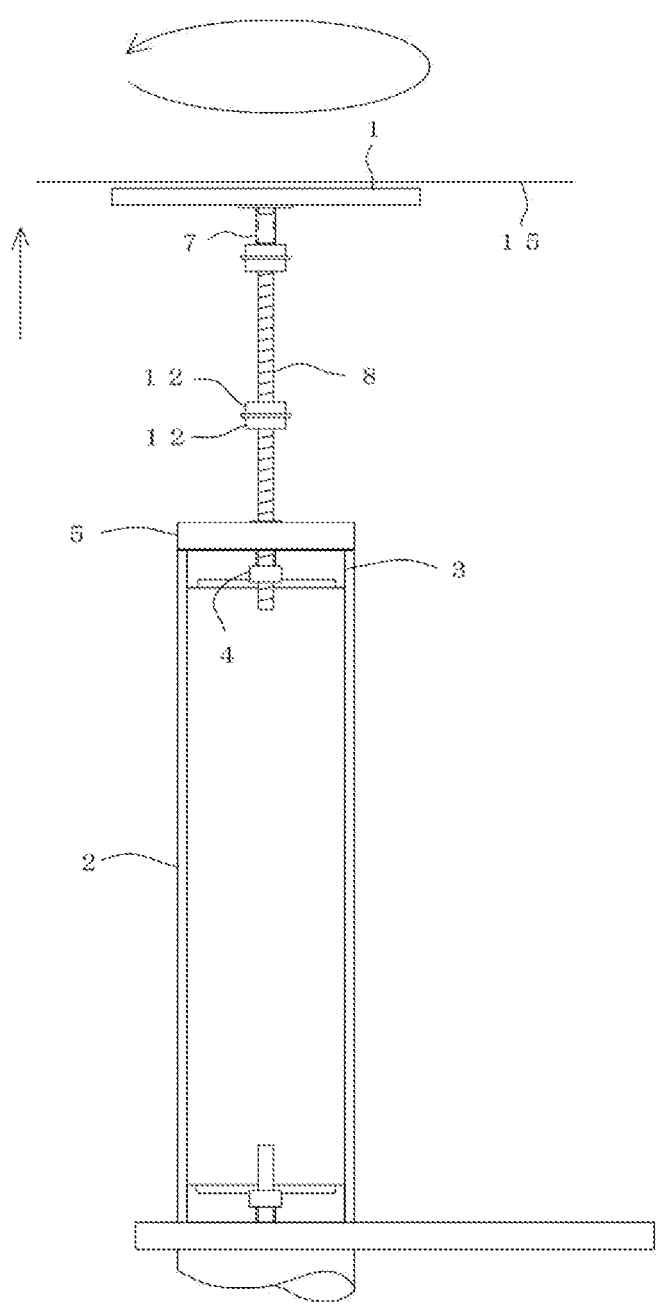
FIG. 11 is a diagram illustrating a method for adjusting the height of the top plate in FIG. 1.

In the above-described embodiment, the elongated thread is inserted into the upper end of the support member at the uppermost part, but as in a cat tower 20A shown in FIG. 26, the disk-shaped upper end plate 5, which is a separate member same as that shown in FIGS. 2 and 3, may be placed on the support member 25 at the uppermost part, the lower portion of the elongated thread 63 may be removably inserted into an unthreaded hole (see the reference numeral 5a in FIG. 1) as an unthreaded hole portion formed in the center of the upper end plate 5, and when the second nut 66 is tightened, the upper end side of the support member 25 at the uppermost part may be pressed via the upper end plate 5.

Specifically, as shown in (1) in FIG. 27, the top plate 50, the top plate height adjustment unit 51, and the upper end plate 5 are prepared. First, the two first nuts 64 are screwed onto the upper portion of the elongated thread 63 with the spring washer 65 sandwiched, the second nut 66 is screwed onto the lower portion, the spring washer 67 and the washer 68 are fitted, and a lower side of the elongated thread 63 is inserted into the unthreaded hole 5a of the upper end plate 5 ((2) in FIG. 27). Then, the upper end portion of the elongated thread 63 is screwed into the adjustment fitting 62 of the top plate 50, the first nuts 64, 64 are turned with a spanner, and tightened and strongly pressed against the adjustment fitting 62, and the top plate 50 and the top plate height adjustment unit 51 are integrated (see (3) in FIG. 27).

Next, the lower end portion of the elongated thread 63 with the top plate 50 attached is inserted into the unthreaded through hole 61a of the thread through fitting 61 provided at the center of the lid member 60 at the upper end portion of the support member 25 at the uppermost part, which is placed horizontally on the floor. The second nut 66 comes into contact with the lid member 60 with the upper end plate 5, the spring washer 67, and the washer 68 sandwiched. In this case, since the unthreaded through hole 61a does not have a female thread that is screwed to the elongated thread 63, it is sufficient to simply insert the lower portion of the elongated thread 63 straight in the axial direction into the unthreaded through hole 61a of the thread through fitting 61 without turning the top plate 50 together with the elongated thread 63 about the axis many times (see FIGS. 28 and 29).

In a state where the top plate 50 is at an appropriate height where the top plate 50 does not abut the ceiling 15, the cat tower 20A is erected on the floor 16 (see FIG. 12) with the base 40 put down, and the operator stands on a stepladder to pull up the top plate 50 together with the elongated thread 63 from the upper end portion of the support member 25 at the uppermost part, and to pull out the lower portion of the elongated thread 63 upward from the unthreaded through hole 61a. In this case, since the unthreaded through hole 61a does not have a female thread, it is sufficient to simply pull out the top plate 50 straight without turning the top plate 50 about the axis many times. As the top plate 50 moves upward, the second nut 66 also moves upward (see FIG. 30).

When the top plate 50 comes into contact with the ceiling 15 (see FIG. 31), the second nut 66 is turned by a hand to move to the lower portion of the elongated thread 63, is tightened to the upper end plate 5, and is pressed against the lid member 60 on the upper end side of the support member 25 at the uppermost part via the spring washer 67, the washer 68, and the upper end plate 5. Accordingly, the top plate 50 presses against the ceiling 15 upward due to a reaction (see FIG. 32).

Finally, the flathead screwdriver 70 is inserted into the vertical grooves 66a formed at three locations on the circumferential side surface of the nut 66 and is turned to further tighten the nut (see FIG. 32), the top plate 50 is strongly pressed against the ceiling 15, and the cat tower 20A is firmly fixed and installed between the floor 16 and the ceiling 15. Accordingly, the top plate 50 can be easily locked to the ceiling 15 (see FIG. 26).

An earthquake-proof gel member may be attached to each of an upper surface of the top plate 50 and a lower surface of the base 40.

When the adjustment fitting 62 is embedded in a lower surface side of the top plate 50 and the first nut 64 screwed onto the elongated thread 63 is tightened, the first nut 64 may press against the lower surface side of the top plate 50.

The present invention may also be used as tower furniture for a pet animal for other small animals such as puppies and hamsters other than cats.

The present invention can be applied to tower furniture for a pet animal on which cats, puppies, and the like kept indoors can exercise.

5 upper end plate
15 ceiling
16 floor
20, 20A cat tower
25 support member
30 support
50 top plate
51 top plate height adjustment unit
60 lid member
61 thread through fitting
62 adjustment fitting
63 elongated thread
61a unthreaded through hole
66 second nut
66a groove

What is claimed is:

1. A tower furniture for a pet animal, the tower furniture comprising:
   a support formed by vertically coupling a plurality of support members;
   a height-adjustable top plate on an upper end portion of a support member at an uppermost part of the plurality of support members;
   an unthreaded hole portion provided at the upper end portion of the support member at the uppermost part;
   a female thread fitting provided at a lower surface of the top plate;
   an elongated thread having an upper end portion configured to be screwed into the female thread fitting and a lower portion configured to be inserted into the unthreaded hole portion;
   a first nut configured to be screwed onto an upper portion of the elongated thread and to press against a female thread fitting side or a lower surface side of the top plate; and
   a second nut configured to be screwed onto a lower portion of the elongated thread and to press against an upper end side of the support member at the uppermost part, wherein
   the second nut presses against the upper end side of the support member at the uppermost part via a spring washer and a washer to support the elongated thread, the first nut, the female thread fitting and the height-adjustable top plate.

2. The tower furniture for a pet animal according to claim 1, wherein
   an upper end plate is placed on an upper side of the support member at the uppermost part,
   the upper end plate is provided with the unthreaded hole portion configured to allow the lower portion of the elongated thread to be inserted, and
   the second nut screwed onto the elongated thread on an upper side of the upper end plate is configured to press against the upper end side of the support member at the uppermost part via the upper end plate.

3. The tower furniture for a pet animal according to claim 2, wherein
   one or more grooves are provided in a circumferential side surface of the second nut to allow rotation about an axis by inserting a flathead screwdriver.

4. The tower furniture for a pet animal according to claim 2, wherein
   a base is attached to a lower side of the support member at a lowest part, and
   a gel member is provided on each of a lower surface of the base and an upper surface of the top plate.

5. The tower furniture for a pet animal according to claim 1, wherein
   one or more grooves are provided in a circumferential side surface of the second nut to allow rotation about an axis by inserting a flathead screwdriver.

6. The tower furniture for a pet animal according to claim 1, wherein
   a base is attached to a lower side of the support member at a lowest part, and
   a gel member is provided on each of a lower surface of the base and an upper surface of the top plate.

* * * * *